(12) United States Patent
Kim

(10) Patent No.: US 9,762,757 B2
(45) Date of Patent: Sep. 12, 2017

(54) MOBILE TERMINAL HAVING AN IMAGE PROJECTOR MODULE AND CONTROLLING METHOD THEREIN

(75) Inventor: Jong Hwan Kim, Suwon-si (KR)

(73) Assignee: LG ELECTRONICS INC., Seoul (KR)

( * ) Notice: Subject to any disclaimer, the term of this patent is extended or adjusted under 35 U.S.C. 154(b) by 788 days.

(21) Appl. No.: 12/910,978

(22) Filed: Oct. 25, 2010

(65) Prior Publication Data

US 2012/0098754 A1    Apr. 26, 2012

(30) Foreign Application Priority Data

Oct. 23, 2010 (KR) .................. 10-2009-0101079

(51) Int. Cl.
| | |
|---|---|
| *G06F 3/041* | (2006.01) |
| *G09G 5/00* | (2006.01) |
| *G02B 27/22* | (2006.01) |
| *H04N 1/00* | (2006.01) |

(52) U.S. Cl.
CPC ....... *H04N 1/00307* (2013.01); *H04N 1/0035* (2013.01)

(58) Field of Classification Search
CPC ............. H04N 13/0033; H04N 13/004; H04N 13/0044; H04N 13/0055; H04N 13/0059; H04N 13/0051; H04N 13/00; H04N 13/0003; H04N 2013/00; H04N 2213/00; H04N 13/0007; H04N 2013/0074; H04N 13/0011; H04N 13/0014; H04N 13/0018; H04N 13/0022; H04N 13/0029; H04N 13/0025; G09G 5/00; G09G 5/397; G06F 3/1423; G02B 27/22

See application file for complete search history.

(56) References Cited

U.S. PATENT DOCUMENTS

| | | |
|---|---|---|
| 5,678,015 A | 10/1997 | Goh |
| 6,774,914 B1 | 8/2004 | Benayoun |
| 2003/0142136 A1* | 7/2003 | Carter et al. .................. 345/782 |

(Continued)

FOREIGN PATENT DOCUMENTS

| | | |
|---|---|---|
| EP | 0685790 A2 | 12/1995 |
| EP | 1403759 A2 | 3/2004 |

(Continued)

*Primary Examiner* — Bryan Earles
(74) *Attorney, Agent, or Firm* — Birch, Stewart, Kolasch & Birch, LLP

(57) ABSTRACT

A mobile terminal having an image projector module and controlling method therein are disclosed, by which a plurality of planes capable of displaying at least one portion of an image displayed on a display unit are rearranged in a 3-dimensional space to be projected on an external plane via a projector module. The present invention includes displaying a first display including at least one planar object on a display unit, selecting a pattern for arranging a plurality of facets in a 3-dimensional space on a second display, selecting an image to be mapped to each of a plurality of the facets from the at least one planar object, mapping the selected image to each of a plurality of the facets, and projecting the second display including a plurality of the facets having the selected image mapped thereto on a prescribed external plane via a projector module.

12 Claims, 21 Drawing Sheets

(56) References Cited

U.S. PATENT DOCUMENTS

| | | | |
|---|---|---|---|
| 2005/0091610 A1* | 4/2005 | Frei | G06F 3/0481 715/804 |
| 2006/0085753 A1* | 4/2006 | Vance | H04M 1/7253 715/753 |
| 2007/0097115 A1* | 5/2007 | Ok et al. | 345/419 |
| 2007/0176914 A1* | 8/2007 | Bae et al. | 345/204 |
| 2008/0049192 A1* | 2/2008 | Nozaki et al. | 353/25 |
| 2008/0055566 A1* | 3/2008 | Yun | 353/82 |
| 2009/0119262 A1 | 5/2009 | Guo et al. | |
| 2009/0131117 A1* | 5/2009 | Choi | 455/566 |
| 2009/0143098 A1* | 6/2009 | Shiono | H04M 1/0272 455/556.1 |
| 2009/0150775 A1* | 6/2009 | Miyazaki | G06F 3/041 715/702 |
| 2011/0035708 A1* | 2/2011 | Damale | 715/863 |
| 2012/0017147 A1* | 1/2012 | Mark | 715/702 |

FOREIGN PATENT DOCUMENTS

| | | |
|---|---|---|
| EP | 1793270 A1 | 6/2007 |
| FR | 2788617 A1 | 7/2000 |
| JP | 7-114451 A | 5/1995 |

\* cited by examiner

FIG. 10
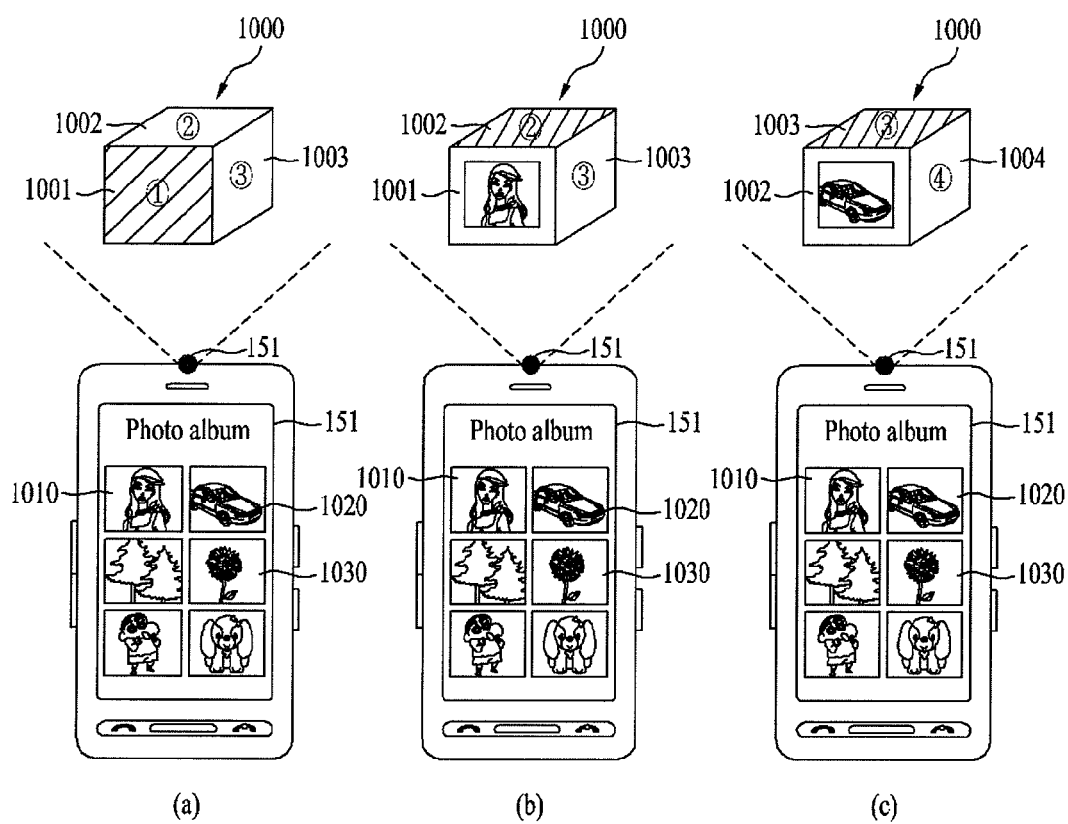
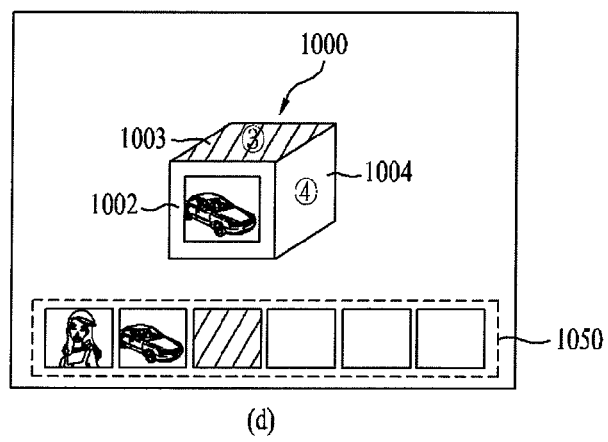

(a)  (b)

FIG. 18
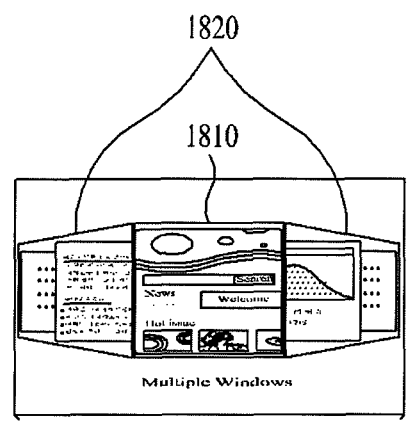
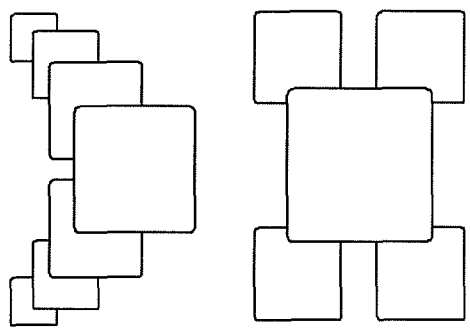
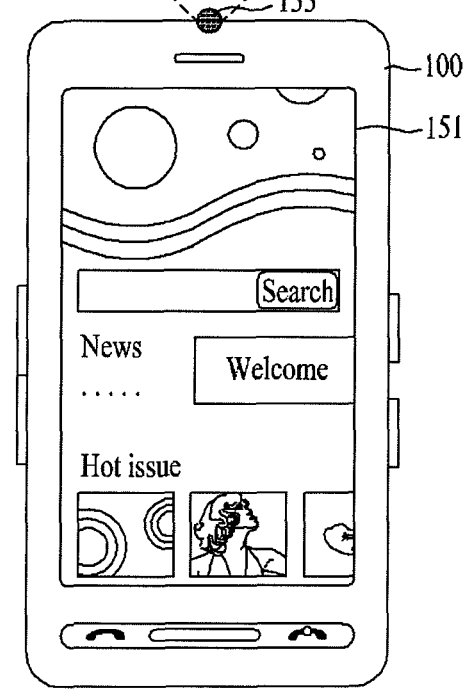
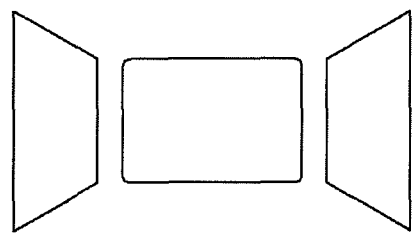
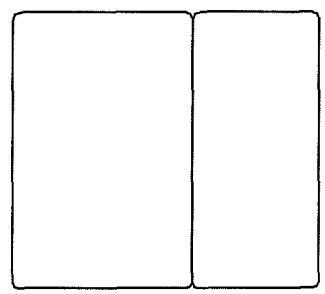
(a)  (b)

MOBILE TERMINAL HAVING AN IMAGE PROJECTOR MODULE AND CONTROLLING METHOD THEREIN

Pursuant to 35 U.S.C. §119(a), this application claims the benefit of earlier filing date and right of priority to Korean Application No. 10-2009-0101079, filed on Oct. 23, 2009, the contents of which are hereby incorporated by reference herein in their entirety.

BACKGROUND OF THE INVENTION

Field of the Invention

The present invention relates to a mobile terminal, and more particularly, a mobile terminal having an image projector module and controlling method therein.

Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or video files, game play, broadcast reception and the like for example.

To support and enhance the terminal functions, the improvement of structural part and/or software part of the terminal can be taken into consideration. As an image projector capable of projecting an image on an external plane is provided to the terminal, the demand for a convenient image projecting method using the image projector is rising.

SUMMARY OF THE INVENTION

Accordingly, the present invention is directed to a mobile terminal having an image projector module and controlling method therein that substantially obviate one or more problems due to limitations and disadvantages of the related art.

An object of the present invention is to provide a mobile terminal having an image projector module and controlling method therein, by which a 3-dimensional (3D) image converted from a 2-dimensional (2D) image can be projected on an external plane.

Another object of the present invention is to provide a mobile terminal having an image projector module and controlling method therein, by which a plurality of planes capable of displaying at least one portion of an image displayed on a display unit are rearranged in a 3-dimensional space to be projected on an external plane via a projector module.

A further object of the present invention is to provide a mobile terminal having an image projector module and controlling method therein, by which information failing to be displayed on an external plane via a display unit can be projected on the external plane via a projector.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit configured to display a first display, a projector module configured to project a second display on an external plane, and a controller controlling an image to be displayed on the second display, wherein the image is generated from mapping at least one different portion of a plurality of planar objects including a planar object displayed on the first display to each of at least two facets arranged in a prescribed pattern in a 3-dimensional space.

In another aspect of the invention, a mobile terminal according to the present invention includes a user input unit, a display unit configured to display a first display, a projector module configured to project a second display on an external plane, and a controller controlling a first one of a plurality of objects to be displayed on the first display, the controller, if a plurality of facets including first and second facets are displayed on the second display in a manner of being arranged in a prescribed 3-dimensional pattern, the controller controlling the first object to be mapped to the first facet.

In a further aspect of the invention, a method of controlling a mobile terminal includes the steps of displaying a first display including at least one planar object on a display unit, selecting a pattern for arranging a plurality of facets in a 3-dimensional space on a second display, selecting an image to be mapped to each of a plurality of the facets from the at least one planar object, mapping the selected image to each of a plurality of the facets, and projecting the second display including a plurality of the facets having the selected image mapped thereto on a prescribed external plane via a projector module.

Accordingly, the present invention provides the following effects and/or advantages.

First of all, a mobile terminal according to the present invention converts a 2D image to a 3D image and then projects the 3D image on an external plane.

Secondly, a plurality of planes capable of displaying at least one portion of an image displayed on a display unit are rearranged in a 3-dimensional space and are then projected on an external plane via a projector module, whereby a new visual effect can be provided to a user.

Thirdly, information failing to be displayed on an external plane via a display unit can be projected on the external plane via a projector, whereby more information can be conveniently viewed without limitation put on a size of a display unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram for one example that an arrangement region is selected by a user in a mobile terminal according to one embodiment of the present invention;

FIG. 18 is a diagram for one example of displaying information failing to be displayed on a display unit of a mobile terminal on a projection plane in addition and one example of configuration of the projection plane according to another embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
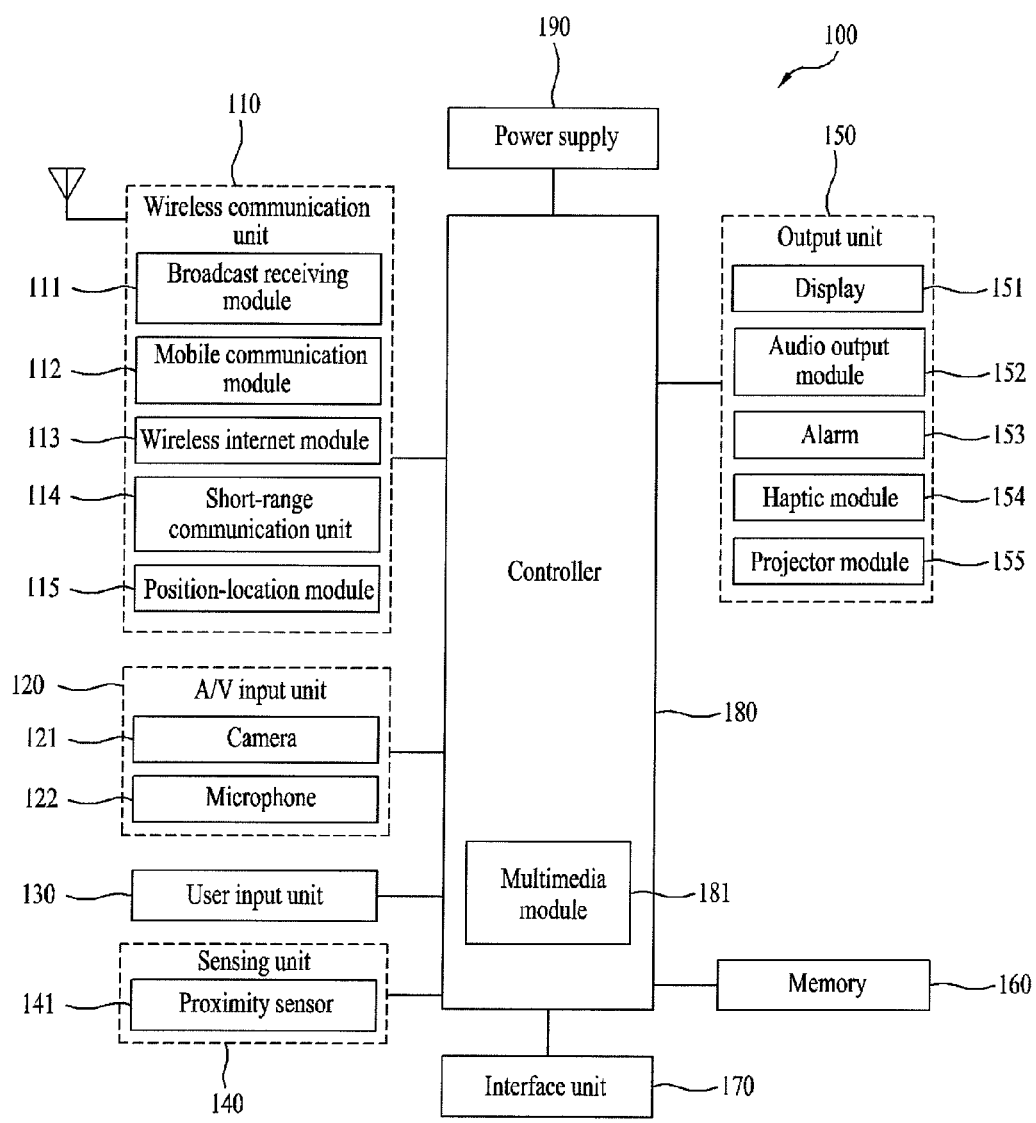
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
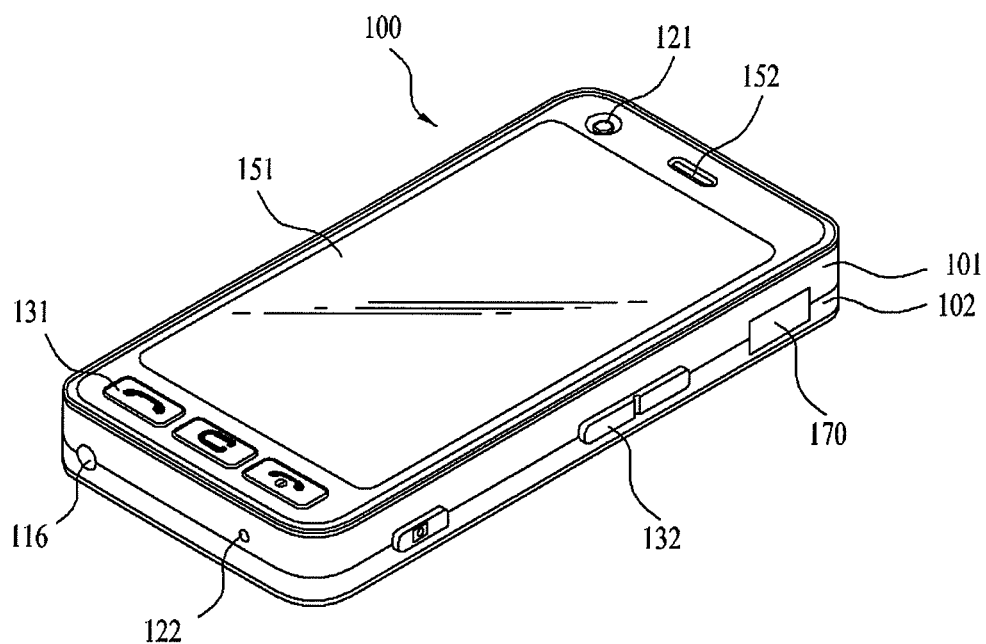
FIG. 2A is a front perspective diagram of a mobile terminal according to one embodiment of the present invention.
Figure 2B:
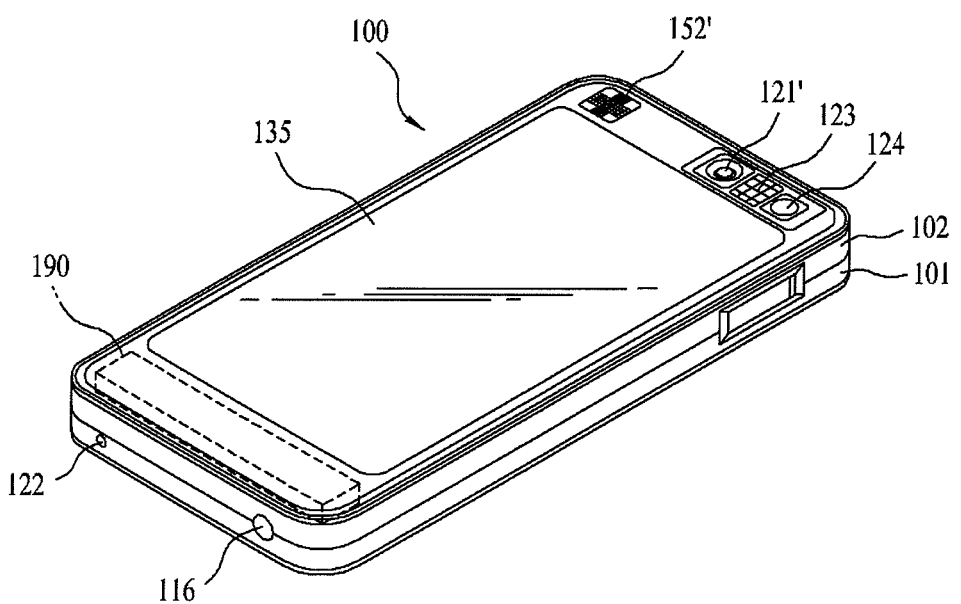
FIG. 2B is a rear perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
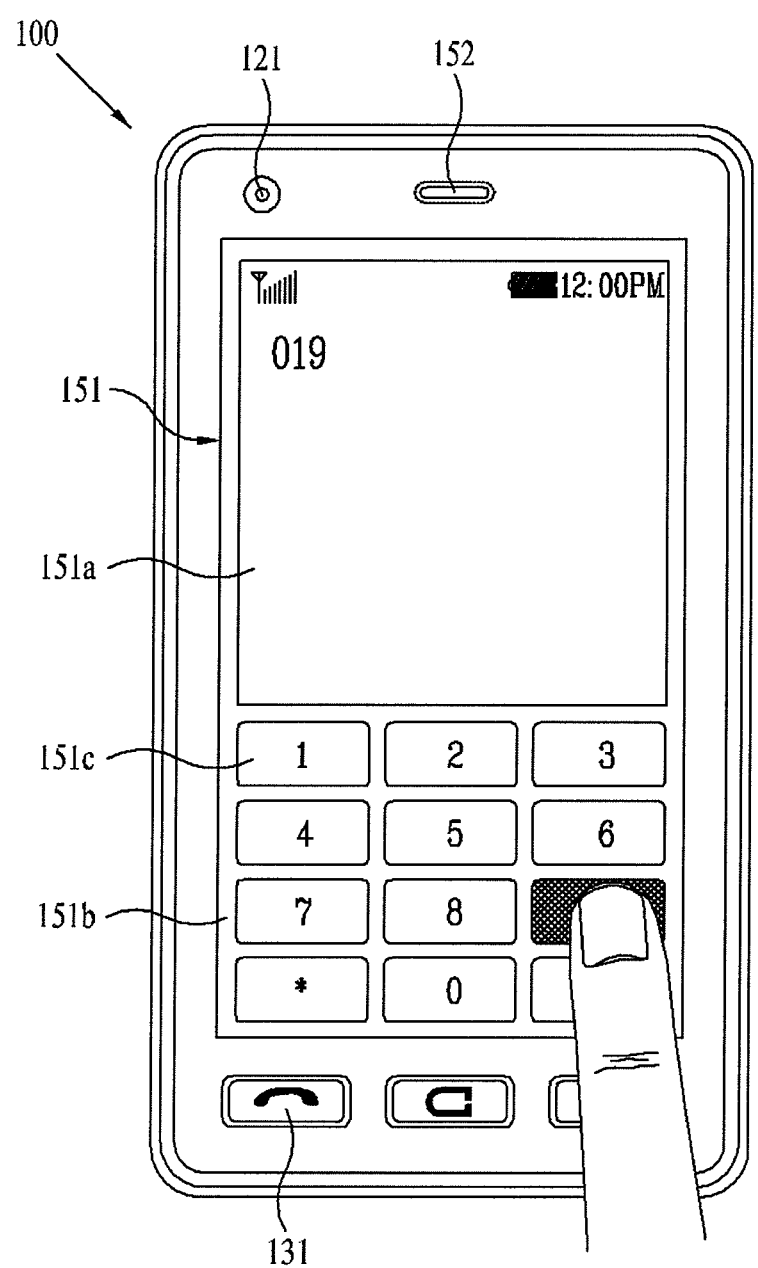
FIG. 3 is a front diagram of a mobile terminal according to one embodiment of the present invention to explain one operational state of the mobile terminal.

FIG. 3 is a front-view diagram of a terminal according to one embodiment of the present invention for explaining an operational state thereof.

First of all, various kinds of visual information can be displayed on the display 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

In the following description, the configuration of the above-described projector module provided to the bar type mobile terminal 100 is explained in detail with reference to FIG. 4A and FIG. 4B.

Figure 4A:
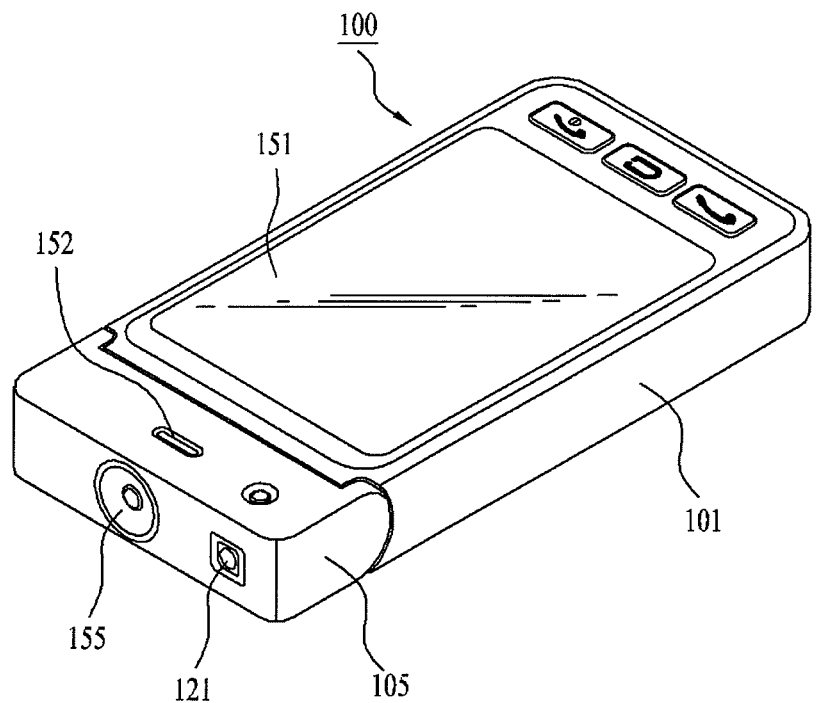
FIG. 4A and FIG. 4B are perspective diagrams of a mobile terminal having an image projector module according to one embodiment of the present invention.
Figure 4B:
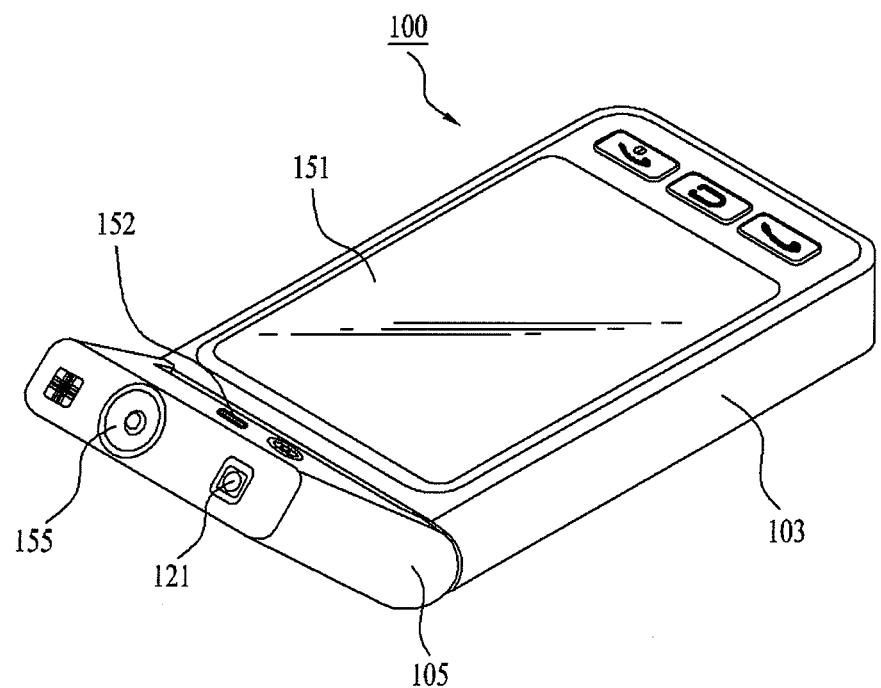

FIG. 4A and FIG. 4B are perspective diagrams of a mobile terminal according to one embodiment of the present invention.

Referring to FIG. 4A, a projector body 105 having a projector module 155 can be rotatably coupled to a main body 103 of the mobile terminal.

In particular, the projector body 105 can be hinged to the main body 103. A projected angle of an image, which is projected using the projector module 155 provided to the projector body 105, can be controlled. And, a camera 121 can be provided to the projector body 105 to photograph the image projected by the projector module 155.

FIG. 4A shows a status before the projector body 105 rotatably coupled to the main body 103 is rotated, and FIG. 4B shows a status after the projector body 105 has been rotated.

Meanwhile, in the manipulation of a touchscreen, 'pointer' or 'cursor' is frequently used as an arrow mark indicating a specific position by being displayed on a display unit. In this disclosure, in order to discriminate 'pointer' and 'cursor' from each other, a figure or the like, which is displayed on a display unit to indicate a specific position, is named 'cursor'. And, a user's finger, a stylus pen or the like, which is used to physically apply a contact touch or a proximity touch to a specific point of a touchscreen, is named 'pointer'.

For clarity and convenience of the following description, assume that a mobile terminal mentioned in the following description includes at least one of the components shown in FIG. 1. Preferably, a mobile terminal, to which the present invention is applicable, includes a display unit 151 and a projector module 155.

First Embodiment

According to one embodiment of the present invention, a mobile terminal reconfigures at least one 2-dimensional (2D) image displayed on the display unit 151 into a plurality of facets in a 3-dimensional (3D) space and is able to project the facets on an external plane. In this case, the 2D image conceptionally includes at least one portion of a plane image normally displayed on a display unit and at least one portion of a plurality of facets spread out in a 3D space. In this case, a plurality of the facets spread out in the 3D space can be arranged individually or in a manner of forming a polyhedron having at least two facets.

In the following description, an object configured with at least two facets arranged in a prescribed pattern or shape in a 3D dimension on the display unit 151 shall be named a 3D object and a user interface including the 3D object shall be named a stereoscopic user interface for clarity. On the contrary, a user interface failing to include a 3D object shall be named a general user interface. Moreover, an external plane (e.g., a projector dedicated screen, a random wall surface, etc.), on which an image projected from the projector module 155 is displayed to configure a single display, or the display itself shall be named a projection plane. Therefore, if 'an object A is displayed on a projection plane', it means that a projector module projects an image corresponding to the object A on an external plane located in a direction faced by the projector module 155.

Meanwhile, a different application is independently executed on each facet configuring a 3D object in a stereoscopic user interface. Alternatively, a single application is executable in a manner of being divided and distributed to a plurality of facets. For instance, in case that three facets exist in a 3D object, a short message service (SMS) relevant menu is displayed on a first one of the three facets, a phonebook is displayed on a second one of the three facets, and a photo album function for appreciating a photo is executed and displayed on a third one of the three facets. For another instance, in case that three facets exist in a 3D object, a photo album function is executed so that different photos can be displayed on the three facets, respectively. An application or menu displayed on each facet is operable according to a user's command input via the user input unit 130. If a specific command is inputted to a random facet, a function corresponding to the inputted command is executable on the corresponding facet.

In the following description, one example of implementing one embodiment of the present invention is explained according to a type of a user interface with reference to FIG. 5 and FIG. 6.

Figure 5:
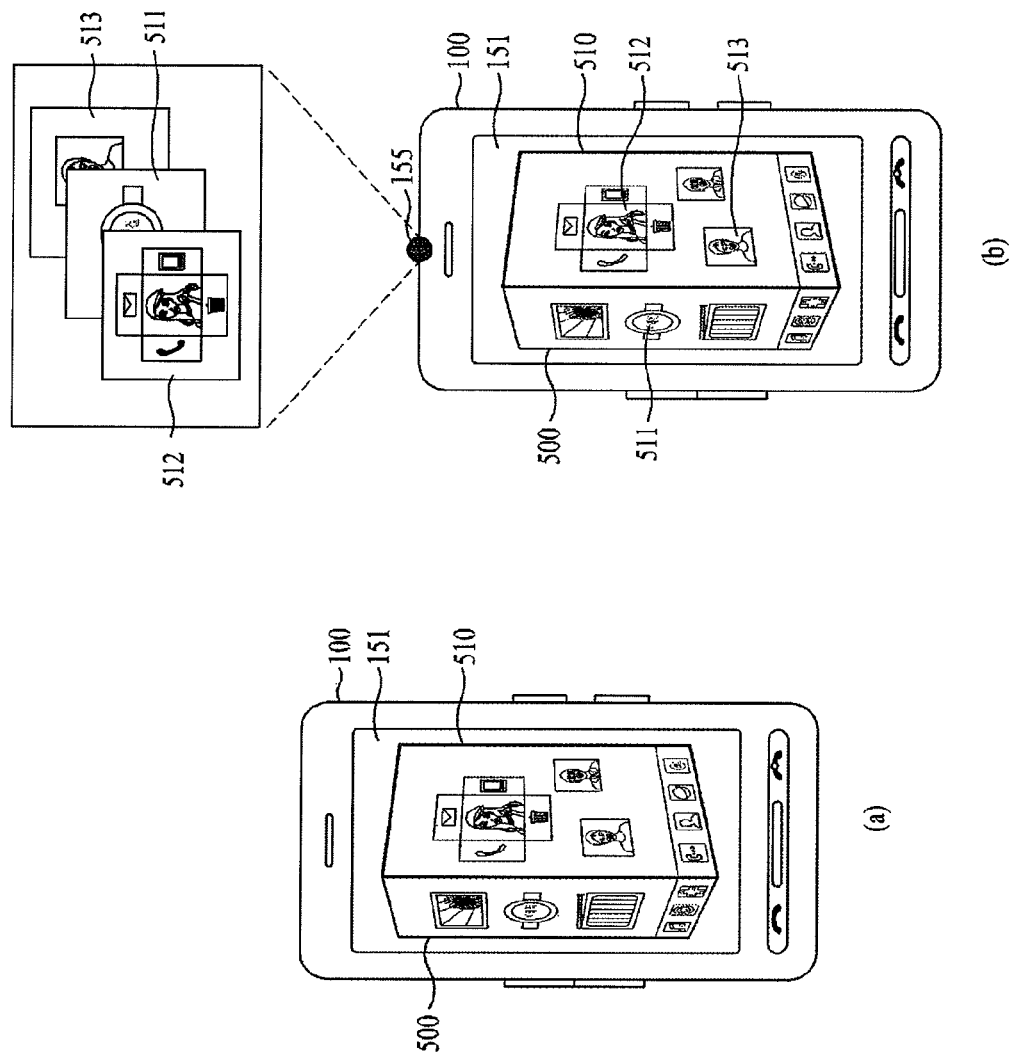
FIG. 5 is a diagram for one example according to one embodiment of the present invention, in which some of facets configuring a 3D object are reconfigured in a 3D space and are then projected via a projector module.

FIG. 5 is a diagram for one example according to one embodiment of the present invention, in which some of facets configuring a 3D object are reconfigured in a 3D space and are then projected via a projector module.

Referring to FIG. 5 (*a*), two facets 500 and 510 of a square pillar are displayed as a 3D object on the display unit 151 of the mobile terminal 100. In case that a different function or application is displayed on each of the facets, a user is able to manipulate the mobile terminal 100 in a manner of conveniently switching four different functions (e.g., 6 different functions in case of a regular hexahedron) to one another by rotating the square pillar.

In this case, referring to FIG. 5 (*b*), as at least one portion of each of the facets is rearranged in a 3D space and can be then projected via the projector module 155. In particular, an icon 511 located in the middle of a left lateral side 500 of the square pillar displayed on the display unit 151 and two icons 512 and 513 located at a right lateral side 501 of the square pillar can be projected by being arranged on different planes, respectively.

Since a size of the display unit 151 of the mobile terminal 100 is generally equal to or smaller than that of the body of the mobile terminal 100, limitation is put on a size of each facet of a 3D object implemented on a stereoscopic user interface. Therefore, if user-specific images are displayed by being rearranged with user-specific patterns (shapes) and sizes in the 3D space, it will be very convenient for user.

In the following description, reconfiguration of a general user interface is explained with reference to FIG. 6.

Figure 6:
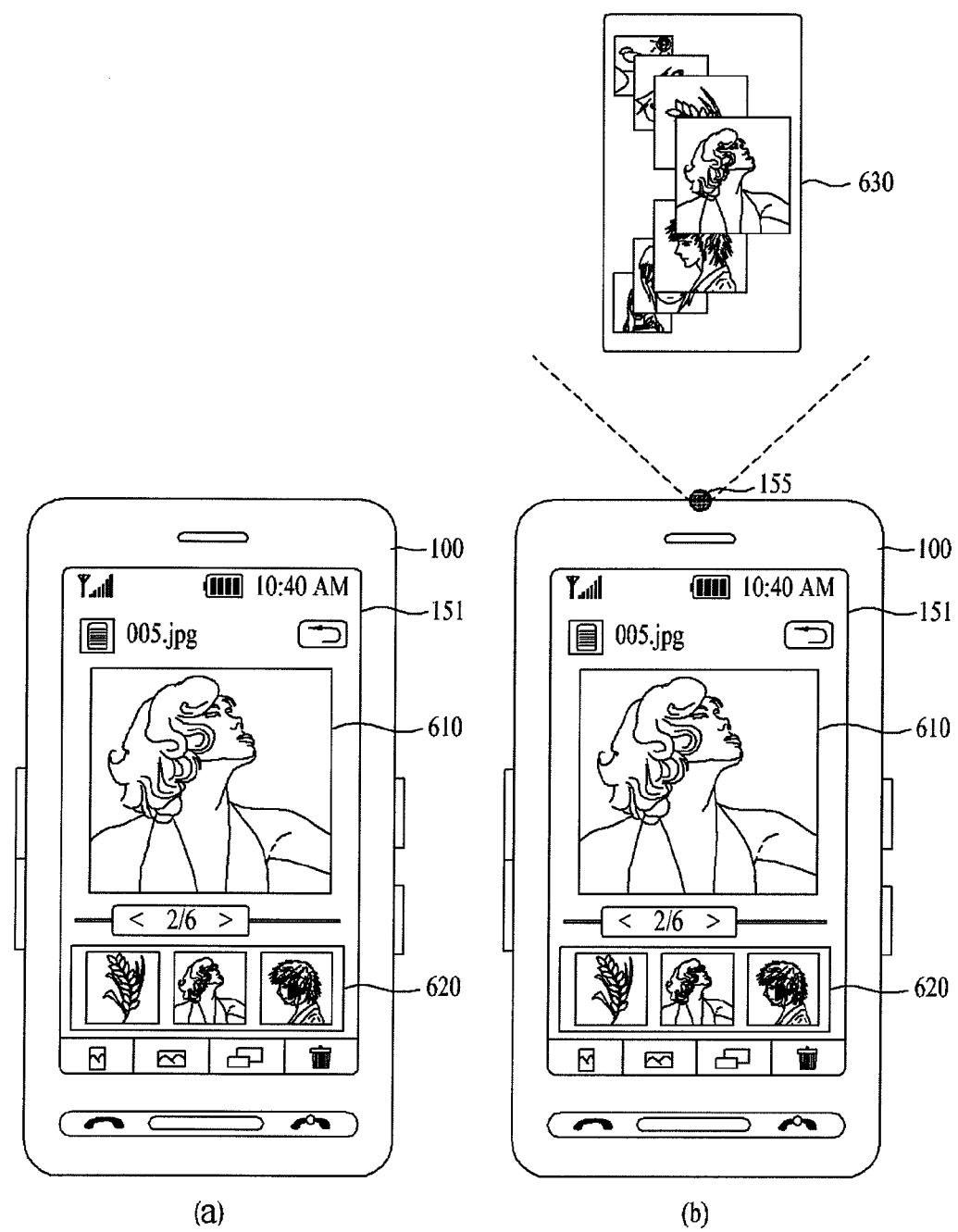
FIG. 6 is a diagram for one example according to one embodiment of the present invention, in which some of facets configuring a general user interface are reconfigured in a 3D space and are then projected via a projector module.

FIG. 6 is a diagram for one example according to one embodiment of the present invention, in which some of facets configuring a general user interface are reconfigured in a 3D space and are then projected via a projector module.

Referring to FIG. 6 (*a*), as a photo album function is executed on the display unit 151 of the mobile terminal 100, an enlarged photo is displayed in a central region of the display unit 151 and a photo list is displayed as thumbnails in a region 620 below the central region 610.

In this case, referring to FIG. 6 (*b*), an image 630 is configured in a manner of arranging the photo displayed in the central region 610 at a head of a 3D space and arranging other photos in the photo list behind the former photo. This image 630 can be then projected via the projector module 155. If so, a user is able to conveniently appreciate the photos in a manner of rearranging the photos, which were displayed as thumbnails due to the limited size of the display unit 151, with specific sizes and patterns (or shapes).

The mobile terminal operating process according to one embodiment of the present invention schematically described with reference to FIG. 5 and FIG. 6 is explained in detail with reference to FIG. 7 as follows.

Figure 7:
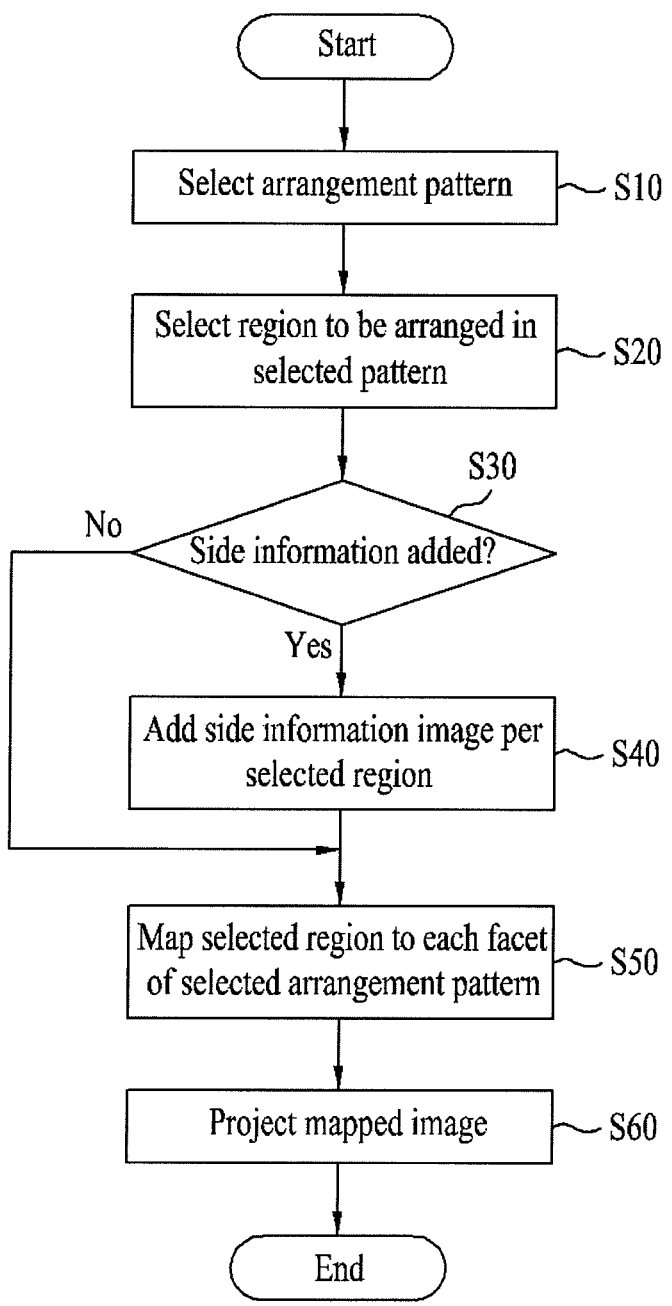
FIG. 7 is a flowchart of a process for a mobile terminal to project an image displayed on a display unit by rearranging the image in a 3D space according to one embodiment of the present invention.

FIG. 7 is a flowchart of a process for a mobile terminal to project an image displayed on a display unit by rearranging the image in a 3D space according to one embodiment of the present invention.

Referring to FIG. 7, it is able to select a pattern for arranging an image displayed on the display unit in a 3D space [S10].

For example of the arrangement pattern, it is able to determine whether a plurality of facets will be arranged to be independent from each other or to configure a polyhedron. If a pattern for a plurality of the facets to configure the polyhedron is determined, it is able to additionally select a type of the polyhedron and a direction for displaying the polyhedron on a projection plane. And, its details shall be described with reference to FIG. 8 and FIG. 9 later.

Once the arrangement pattern is selected, the number of facets displayed on the projection plane is determined according to the selected arrangement pattern as well. Therefore, a region to be arranged on each of the facets can be selected from the image displayed on the display unit 151 [S20].

The region to be arranged on each of the facets is automatically selected by a preset rule or can be selected according to a user's command input via the user input unit 130. And, its details shall be described with reference to FIG. 10 to 12 later.

Subsequently, it may be able to determine whether to add side information [S30].

In this case, the side information means the information not displayed on the display unit 151 currently despite existing within the mobile terminal 100, e.g., the memory 160.

If the side information exists, the side information can be added per region which will be projected on each of the facets selected in the step S20 [S40].

For example of the side information, when a phonebook is displayed on the display unit 151, assume that phone numbers and names corresponding to the phone numbers respectively are displayed only. In this case, in case that a picture file (e.g., a photo of a character corresponding to a phone number) linked to a specific number exists in the memory 160, the number, the name and the photo linked to the number can be displayed on one facet in a 3D dimension of a projection plane together. And, its details shall be described with reference to FIG. 17 later.

Once the arrangement pattern of a plurality of the facets in the 3D space to be projected on the projection plane, the region to be arranged on each of the facets and the side information per region are selected, the controller 180 performs mapping the selected region and side information to each of the facets having the selected arrangement pattern and is then able to project a mapped image to an external plane via the projector module [S50, S60].

In the following description, an operation of the above described mobile terminal according to one embodiment of the present invention is explained in detail in order of 1) arrangement pattern selection, 2) region selection, 3) projection plane control, 4) projection region display and 5) side information addition with reference to FIG. 7.

First of all, a method of selecting the arrangement pattern described with reference to the step S10 in FIG. 7 is explained with reference to FIG. 8 and FIG. 9 as follows.

1) Arrangement Pattern Selection

As mentioned in the foregoing description, a mobile terminal according to the present invention arranges a plurality of facets, on which at least one portion of an image displayed on a display unit is displayed, in a 3D space and is then able to project them to an external plane via a projector module. In this case, the pattern for arranging a plurality of the facets is set in advance or can be selected at a random timing point according to user's necessity.

Figure 8:
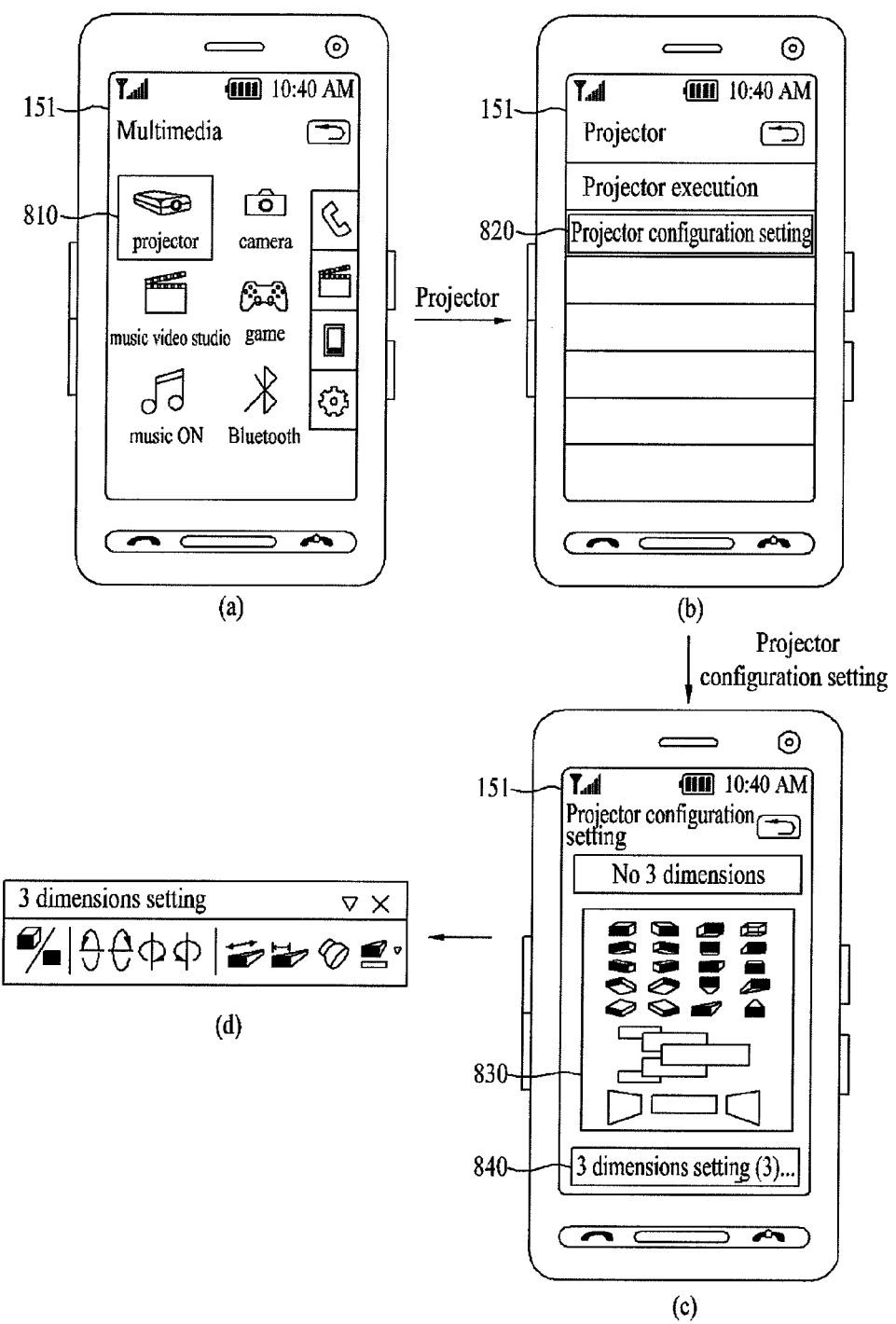
FIG. 8 is a diagram for a method of selecting an arrangement pattern in advance via a prescribed menu manipulation in a mobile terminal according to one embodiment of the present invention.

FIG. 8 is a diagram for a method of selecting an arrangement pattern in advance via a prescribed menu manipulation in a mobile terminal according to one embodiment of the present invention.

Referring to FIG. 8 (a), a user is able to select a projector relevant icon 810 by performing a prescribed menu manipulation on a mobile terminal. Subsequently, if a projector configuration setting menu 820 is entered [FIG. 8 (b)], the user is able to select one of various arrangement patterns 830 prepared in advance [FIG. 8 (c)]. In this case, the prepared arrangement patterns can be provided in a manner that a plurality of facets are arranged in a 3D space by being spaced apart not to come in contact with each other. Alternatively, the prepared arrangement patterns can be provided in a manner that a plurality of facets configure a single polyhedron together. After the user has selected one of the arrangement patterns, the user is able to change a size of the selected arrangement pattern via a 3D setting menu 840 or is able to further change a displayed direction on a projection plane by rotating the selected arrangement pattern via the 3D setting menu 840 [FIG. 8 (d)].

Figure 9:
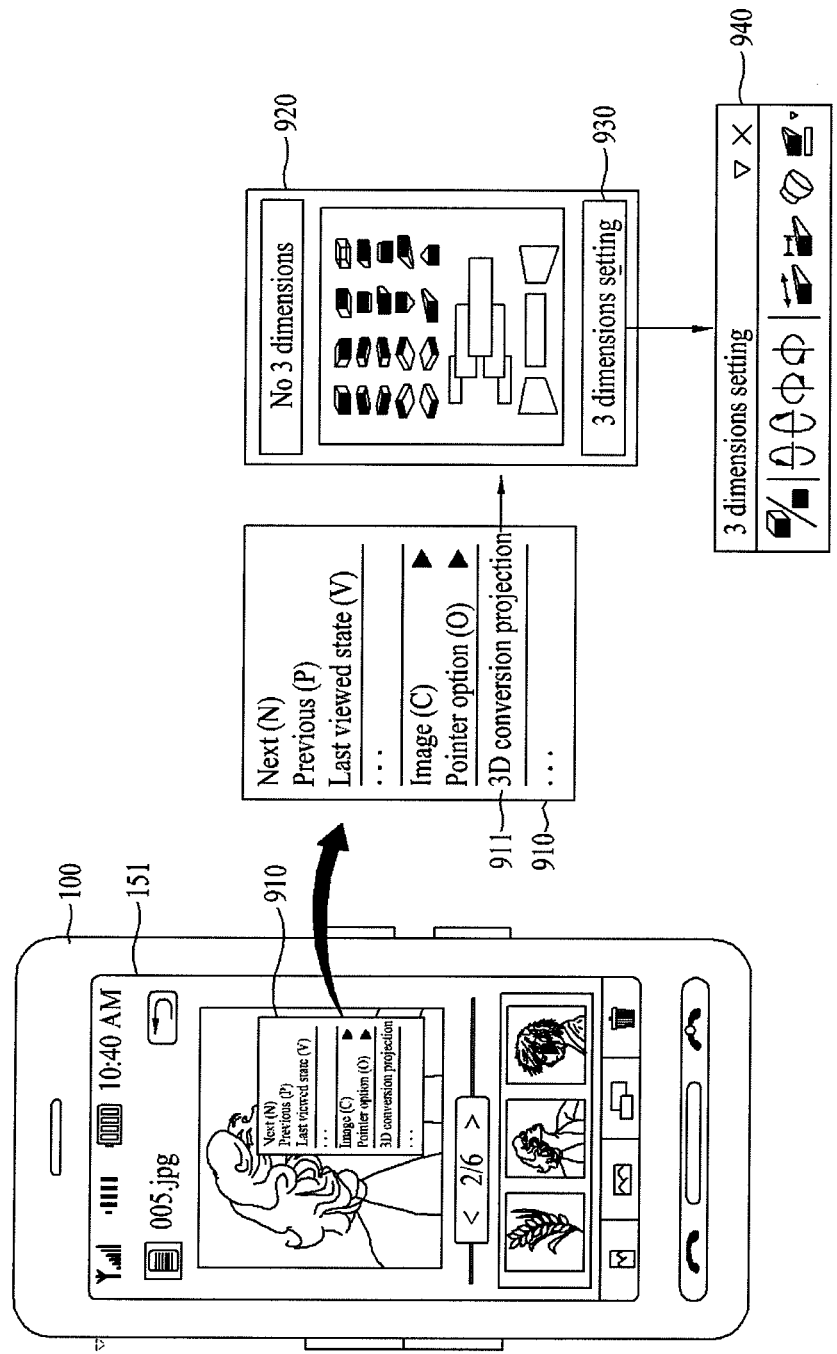
FIG. 9 is a diagram for a method of selecting an arrangement pattern at a random timing point via a prescribed menu manipulation in a mobile terminal according to one embodiment of the present invention.

FIG. 9 is a diagram for a method of selecting an arrangement pattern at a random timing point via a prescribed menu manipulation in a mobile terminal according to one embodiment of the present invention.

Referring to FIG. 9, a photo album function is executed on the display unit 151 of the mobile terminal. In case that a user attempts to view an image, in which photos displayed in a photo album are rearranged in a 3D space, via a projection plane, the user pages a menu window 910 through a prescribed menu manipulation and is then able to select an item of '3D conversion projection' 911 from the menu window 910. Accordingly, arrangement patterns prepared in advance can be displayed on the display unit 151. In this case, the user is able to have a 3D setting menu 940 by selecting an item of '3D setting' 930, as mentioned in the foregoing description with reference to FIG. 8 (c) and FIG. 8 (d), and is then able to perform a detailed modification on the arrangement pattern through the entered 3D setting menu 940.

In the following description, a method of selecting an image, which will be mapped to each of the facets in the description of the step S20 shown in FIG. 7, according to a preset rule or via a display unit is explained with reference to FIG. 10 to 12.

2) Arrangement Region Selection

As a pattern for arranging a plurality of facets, on which at least one portion of an image displayed on the display unit 151 is displayed, in a 3D space of a projection plane projected via the projector module 155 is selected, the number of facets to be arranged in the 3D space is determined as well. Accordingly, images, which will be mapped to facets of the projection plane, respectively, are selected from the display unit 151 by a user or by the controller 180 according to a preset rule.

For instance, in case of a photo album function, assume a case that photos, which will be mapped to the facets to be ranged in the 3D space of the projection plane, are selected by the controller 180. In this case, a photo currently appreciated by a user or a photo located at the head of a photo list is displayed on a specific facet of a previously selected arrangement pattern and the rest of the photos included in the photo list can be displayed on the rest of the facets according to a preset pattern with reference to the specific facet, respectively. Moreover, even if a photo is not being displayed on the display unit 151, it can be selected by the controller 180 and can be then arranged on a specific facet of the projection plane.

Meanwhile, a user is able to select a photo in direct. This is described with reference to FIG. 10 as follows.

FIG. 10 is a diagram for one example that an arrangement region is selected by a user in a mobile terminal according to one embodiment of the present invention.

Referring to FIG. 10, assume a case that a photo album function is executed on the display unit 151 of the mobile terminal. And, assume a case that an arrangement pattern is selected to enable facets, which will be arranged in a 3D space on a projection plane, to construct a hexahedron. In this case, assuming that a single photo is mapped to a single facet, it is able to select photos as many as six of them.

Referring to FIG. 10 (a), first to third facets 1001, 1002 and 1003 of a hexahedron 1000 are displayed on the projection plane. In this case, a prescribed visual effect (e.g., oblique lines, etc.) can be represented on the first facet 1001 of the hexahedron 100 to indicate that a selected photo is mapped to the first facet 1001 itself. Accordingly, a user is able to select a photo 1010 at an upper left end on the display unit 151 via a prescribed menu manipulation.

As the user selects the photo 1010, referring to FIG. 10 (b), the photo selected by the user is displayed on the projection plane in a manner of being mapped to the first facet 1001 standing by for the selection of a photo to be mapped. And, a photo selected next by the user can be displayed on the second facet 1002 in a manner of having a prescribed visual effect indicating that the photo is mapped to the second facet 1002 itself.

Afterwards, if the user selects a photo 1020 at an upper right end of the display unit 151, referring to FIG. 10 (c), the photo selected by the user is displayed on the second facet 1002 by being mapped thereto. In this case, since the photos are mapped to all of the three facets displayed on the projection plane in the hexahedron 1000, the controller 180 rotates the hexahedron 1000 once to display a fourth facet 1004 to enable photos to be selected for the mapping to the rest of three facets. And, a photo selected next by the user can be displayed on the third facet 1003 in a manner of having a prescribed visual effect indicating that the photo is mapped to the third facet 1003 itself.

The photos, which will be mapped to the facets arranged by the previously selected pattern in the 3D space through the above described methods shown in FIG. 10 (a) to FIG. 10 (c), can be sequentially selected by the user.

In this case, thumbnails of the photos mapped to the facets respectively and a prescribed visual effect indicating the standby for selection can be displayed on a lower end 1050 of the projection plane. Of course, the arrangement pattern of the thumbnails and the position on the projection plane are changeable if necessary.

This arrangement region selection can be performed in a manner of allocating a shortcut key number to each object or region and then inputting a shortcut key command corresponding to a specific region. This is explained with reference to FIG. 11 as follows.

Figure 11:
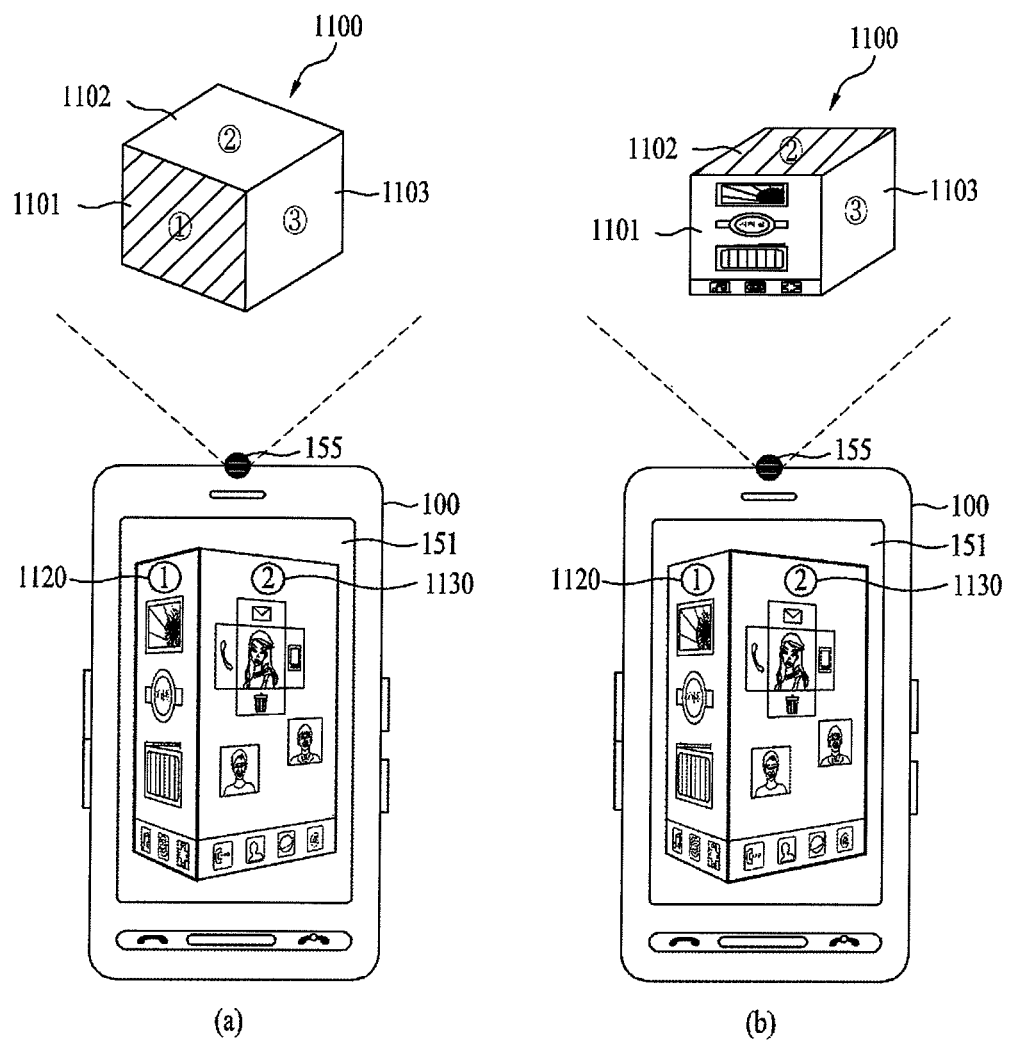
FIG. 11 is a diagram for another example that an arrangement region is selected by a user in a mobile terminal according to one embodiment of the present invention.

FIG. 11 is a diagram for another example that an arrangement region is selected by a user in a mobile terminal according to one embodiment of the present invention.

Referring to FIG. 11, assume a case that a 3D object of a square pillar type is displayed as a stereoscopic user interface on the display unit 151 of the mobile terminal. And, assume a case that an arrangement pattern is selected to enable facets, which will be arranged in a 3D space on a projection plane, to construct a hexahedron.

Referring to FIG. 11 (a), when two facets of a square pillar, i.e., a left lateral side 1120 and a right lateral side 1130 are displayed on the display unit 151 of the mobile terminal 100, assume that short cut keys #1 and #2 are designated to the left lateral side 1120 and the right lateral side 1130, respectively.

And, first to third facets 1101, 1102 and 1103 of a hexahedron 1100 are displayed on the projection plane. In this case, a prescribed visual effect (e.g., oblique lines, etc.) can be represented on the first facet 1101 of the hexahedron 1100 to indicate that a selected photo is mapped to the first facet 1101 itself.

In case that a user intends to arrange the left lateral side 1120 of the 3D object at the first facet 1101 of the hexahedron 1100, the user is able to input a command corresponding to the shortcut key #1. For example of this command, a numeral 1 key of a hardware key button of the user input unit 130 is inputted, a random key is inputted once, a shortcut key #1 region 1120 is touched (e.g., long touch, long proximity touch, etc.), a jog wheel provided to the mobile terminal is rotated counterclockwise, a mobile terminal having a sensor for detecting an inclination of the mobile terminal is inclined to the left or is shaken once, or the like.

If the user selects the shortcut key #1 facet 1120, referring to FIG. 11 (b), the shortcut key #1 facet selected by the user is displayed on the first facet 1101 standing by for the selection of a region, which will be arranged on the projection plane, by being mapped to the first facet 1101. Moreover, a prescribed visual effect, which indicates that a region selected next by the user will be mapped to the second facet 1102, can be given to the second facet 102. In case that a user intends to arrange the right lateral side 1130 of the 3D object at the second facet 1102 of the hexahedron 1100, the user is able to input a command corresponding to the shortcut key #2. For example of this command, a numeral 2 key of a hardware key button of the user input unit 130 is inputted, a random key is inputted twice, a shortcut key #2 region 1130 is touched (e.g., long touch, long proximity touch, etc.), a jog wheel provided to the mobile terminal is rotated clockwise, the mobile terminal having a sensor for detecting an inclination of the mobile terminal is inclined to the right or is shaken twice, or the like.

The arrangement region selection can be performed via a touch action for specifying a region on the display unit. This is explained with reference to FIG. 12 as follows.

Figure 12:
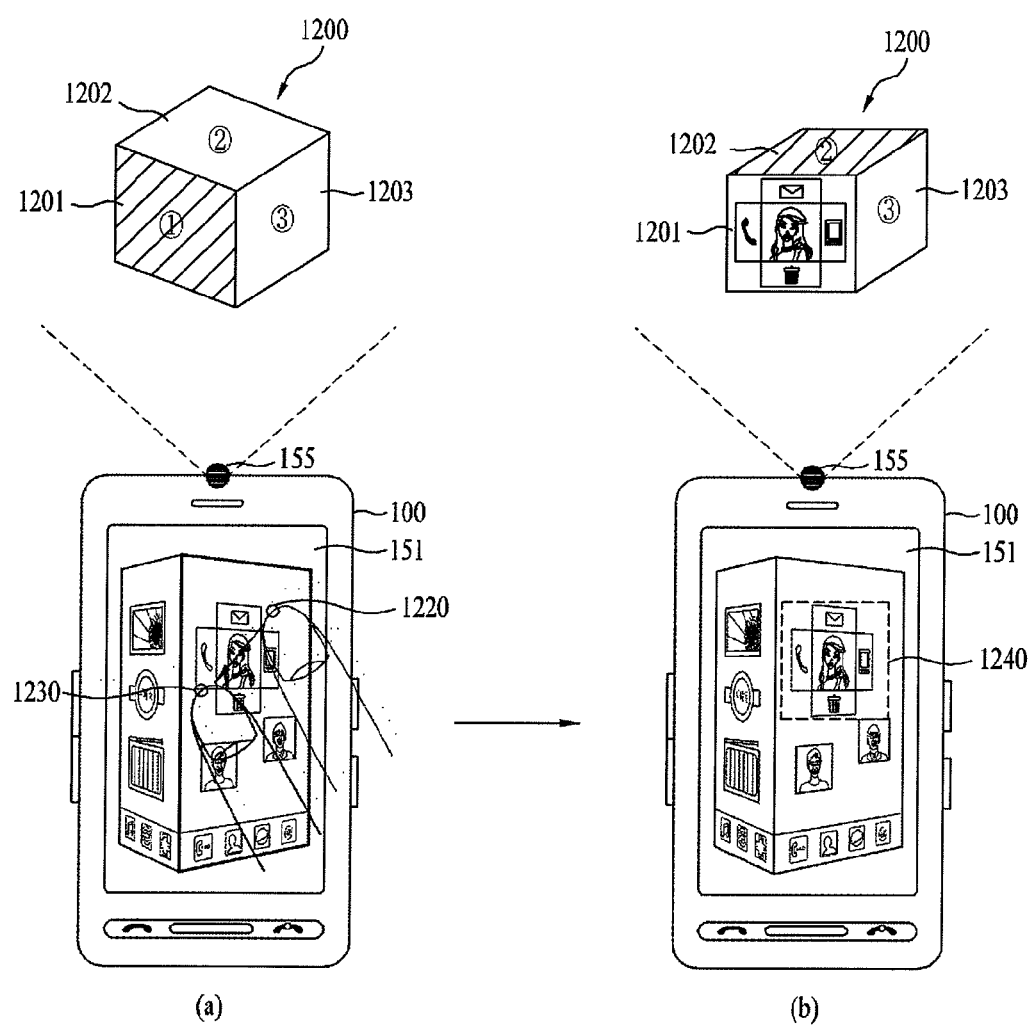
FIG. 12 is a diagram for a further example that an arrangement region is selected by a user in a mobile terminal according to one embodiment of the present invention.

FIG. 12 is a diagram for a further example that an arrangement region is selected by a user in a mobile terminal according to one embodiment of the present invention.

Referring to FIG. 12, assume that the mobile terminal 100 includes a touchscreen capable of recognizing a user's touch command as the display unit 151. And, assume a case that a 3D object of a square pillar type is displayed as a stereoscopic user interface on the display unit 151 of the mobile terminal. Moreover, assume a case that an arrangement pattern is selected to enable facets, which will be arranged in a 3D space on a projection plane, to construct a hexahedron.

And, first to third facets 1201, 1202 and 1203 of a hexahedron 1100 are displayed on the projection plane. In this case, a prescribed visual effect (e.g., oblique lines, etc.) can be represented on the first facet 1201 of the hexahedron 1200 to indicate that a selected photo is mapped to the first facet 1201 itself.

In this case, referring to FIG. 12 (a), a user is able to perform a touch & drag action on the touchscreen 151 to map (arrange) a portion of a right lateral side of a 3D object to the first facet 1201 of the hexahedron 1200. In particular, the user starts a touch input with one corner 1220 of a region, which will be mapped to the first facet 1201 standing by for an arrangement region input, maintains and drags the touch input to another corner 1230 located in a diagonal direction of the start point 1220, and then releases the touch input. In this manner, the user is able to designate the region to map.

If so, referring to FIG. 12 (b), a rectangular region 1240, which has the touch start point 1220 and the touch end point 1230 in FIG. 12 (a) as two corners confronting each other in a diagonal direction, can be mapped (or arranged) to the first facet 1201.

The above-described arrangement region specifying method teaches that the touch & drag action is inputted in the diagonal direction, by which the present invention is non-limited. Alternatively, the present invention is applicable to every touch action capable of specifying a region.

In the following description, a method of controlling a plurality of facets arranged in a 3D space on a projection plane is explained with reference to FIG. 13 to 15.

3) Projection Plane Control

As mentioned in the foregoing description, the mobile terminal according to the present invention rearranges a plurality of facets, on which at least one portion of an image displayed on the display unit, in a 3D space and is then able to project the facets on an external plane via the projector module. Therefore, a content and/or shape displayed on the display unit 151 may be different from that displayed on the projection plane. Accordingly, a method of controlling the facets arranged on the projection plane is requested.

In the following description, a method of controlling a projection plane in a manner that a result of a general manipulation performed on the display unit 151 is reflected on a projection plane is explained with reference to FIG. 13.

Figure 13:
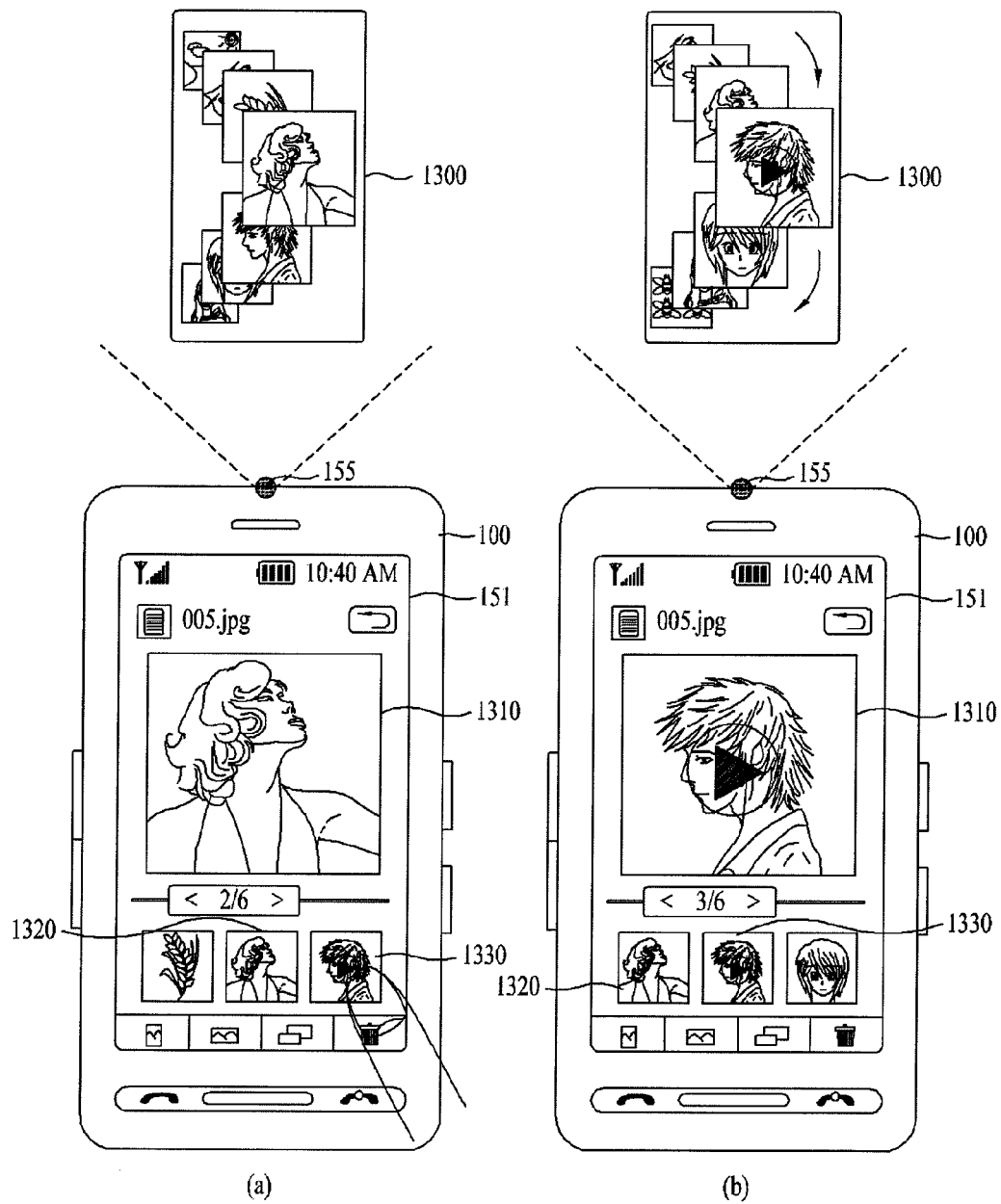
FIG. 13 is a diagram for one example of a method off controlling a projection plane in a mobile terminal according to one embodiment of the present invention.

FIG. 13 is a diagram for one example of a method off controlling a projection plane in a mobile terminal according to one embodiment of the present invention.

The basic setting shown in FIG. 13 is similar to that shown in FIG. 6 (b) and its redundant description shall be omitted from the following description.

Referring to FIG. 13 (a), in order to change a photo 1320 displayed at a center 1310 of the display unit 151 by being zoomed in, a user is able to select another photo 1330 from a photo list via a touch input.

As a result, referring to FIG. 13 (b), the selected photo 1330 is displayed at the center 1310 of the display unit 151. Therefore, arrangement of photos on a projection plane can be changed in a manner that the photo 1330 selected by the user is relocated at the center 1310.

A method of displaying a cursor on a projection plane and then manipulating the projection plane using the cursor is explained with reference to FIG. 14 as follows.

Figure 14:
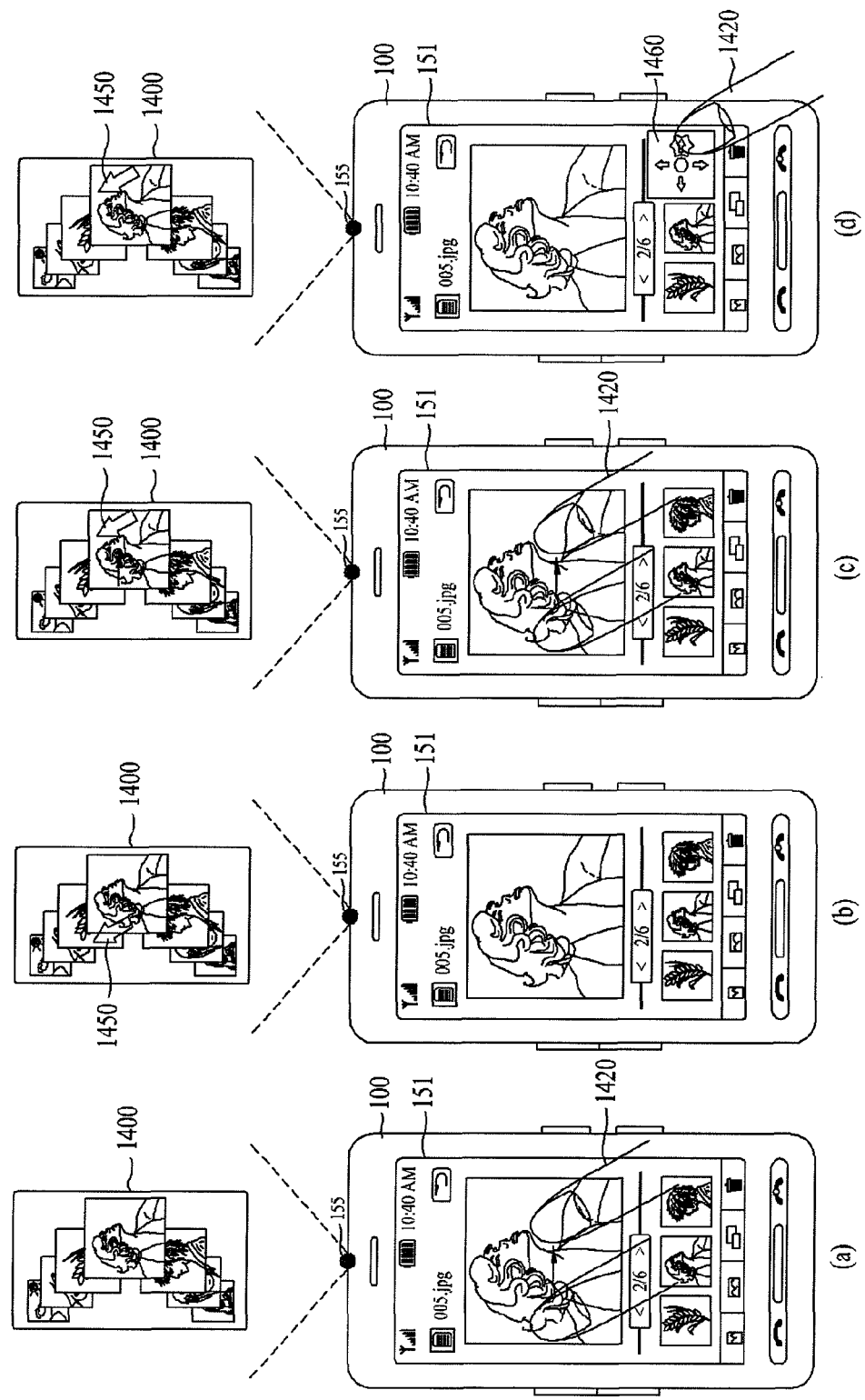
FIG. 14 is a diagram for another example of a method off controlling a projection plane in a mobile terminal according to one embodiment of the present invention.

FIG. 14 is a diagram for another example of a method off controlling a projection plane in a mobile terminal according to one embodiment of the present invention.

In FIG. 14, assume that the display unit 151 of the mobile terminal includes a touchscreen.

Referring to FIG. 14 (a), in order to generate a cursor on a projection plane 1400, a user is able to input a prescribed menu manipulation via the user input unit 130 of the mobile terminal or a touch manipulation (e.g., left-to-right reciprocation by touch & drag action, etc.) of a specific pattern via the touchscreen 151. Hence, referring to FIG. 14 (b), a cursor 1450 can be displayed on the projection plane 1400. In this case, the cursor 1450 is displayed on the projection plane 1400 only or can be displayed on both of the projection plane 1400 and the touchscreen 151.

Once the cursor 1450 is generated on the projection plane 1400, the controller 180 enables the cursor 1450 to move on the projection plane 1400 to correspond to the user's touch input via the touchscreen 151. For instance, if the user inputs a touch & drag action in a left-to-right direction, as shown in FIG. 14 (c), the cursor 1450 on the projection plane 1400 can move in the left-to-right direction. Instead of moving the cursor, a selection function of the cursor can be performed in a manner of applying two consecutive touch inputs or a long-touch input to the same point on the touchscreen 151.

When the cursor 1450 displayed on the projection plane 1400 is manipulated by the above described method, the controller 180 preferably controls the user's touch input not to directly affect a content (i.e., a user interface) displayed on the touchscreen 151. Instead, the controller 180 enables a result of the cursor manipulation on the projection plane to be reflected on the display unit.

According to another method of manipulating the cursor 1450 on the projection plane 1400, referring to FIG. 14 (d), a cursor dedicated navigation window 1460 for manipulating the cursor 1450 can be displayed on the touchscreen 151. A user is able to move the cursor by applying a touch input to arrows of the navigation window 1460. If a hardware navigation key button is provided to the user input unit 130, when the cursor is displayed on the projection plane, the cursor can be manipulated via the hardware navigation key button.

The cursor 1450 can disappear if a user does not apply a touch input for predetermined duration.

Meanwhile, a motion of a point on a projection plane can be recognized using the camera 121. This method is described with reference to FIG. 15 as follows.

Figure 15:
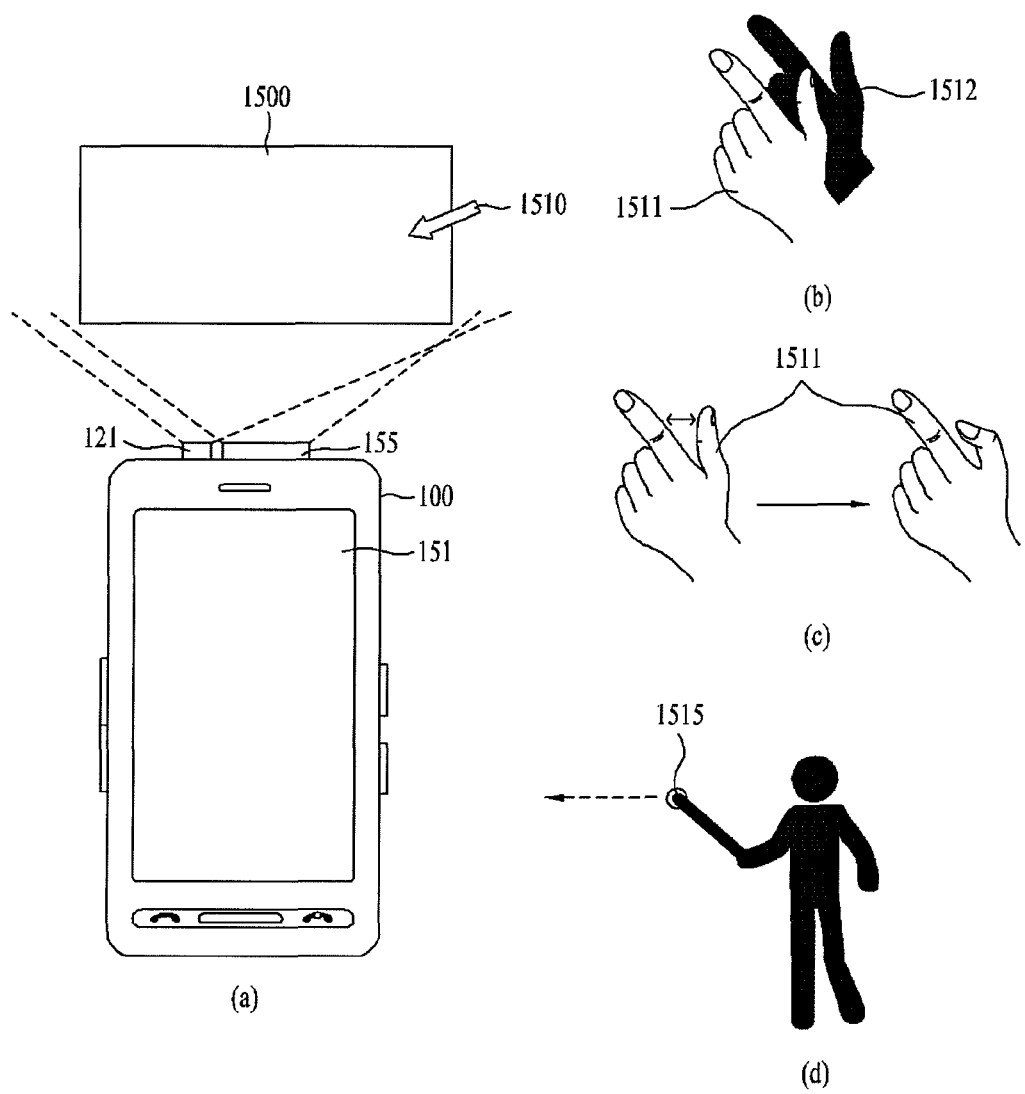
FIG. 15 is a diagram for a further example of a method of controlling a projection plane in a mobile terminal according to one embodiment of the present invention.

FIG. 15 is a diagram for a further example of a method of controlling a projection plane in a mobile terminal according to one embodiment of the present invention.

Referring to FIG. 15 (a), a camera 121 can be provided to a mobile terminal toward the same direction in which a projector module 155 projects an image. In this case, a view angle of the camera is preferably set greater than a projection angle of the projector module 155. In particular, the camera preferably has a property of photographing a projection plane or an area wider than the projection plane. In case that a pointer 1510 is located on a projection plane 1500 formed via the projector module 155 of the mobile terminal, the camera 121 is able to photograph an image including the projection plane 1500 and the pointer 1510 therein.

The controller 180 is able to detect a position and/or operation pattern of the pointer 1510 for the projection plane 1500 using the image photographed by the camera 121.

Referring to FIG. 15 (b), if the pointer includes a hand 1511, a shadow 1512 is generated on the projection plane due to a light projected from the projector module 155. The controller 180 is able to recognize a location of the hand against the projection plane 1500 using the image photographed by the camera 121. If a gap between the hand 1511 and the shadow 1522 enters a range of a predetermined distance, the controller 180 is able to recognize that a selection command is inputted.

According to another method of inputting a selection command, referring to FIG. 15 (c), a gesture of a hand can be changed.

Instead of using a hand, a pointer having a specific visual pattern 1515 at one end portion is available. If the pointer having the specific visual pattern 1515 is used, the controller 180 is able to conveniently detect a more accurate position of the pointer using an image photographed by the camera 121.

In the following description, a method of informing a user of a region on a display unit corresponding to an activated facet on a projection plane is explained.

4) Projection Region Display

According to one embodiment of the present invention, a method of informing a user of a region on a display unit corresponding to an activated facet on a projection plane is provided. This is described with reference to FIG. 16 as follows.

Figure 16:
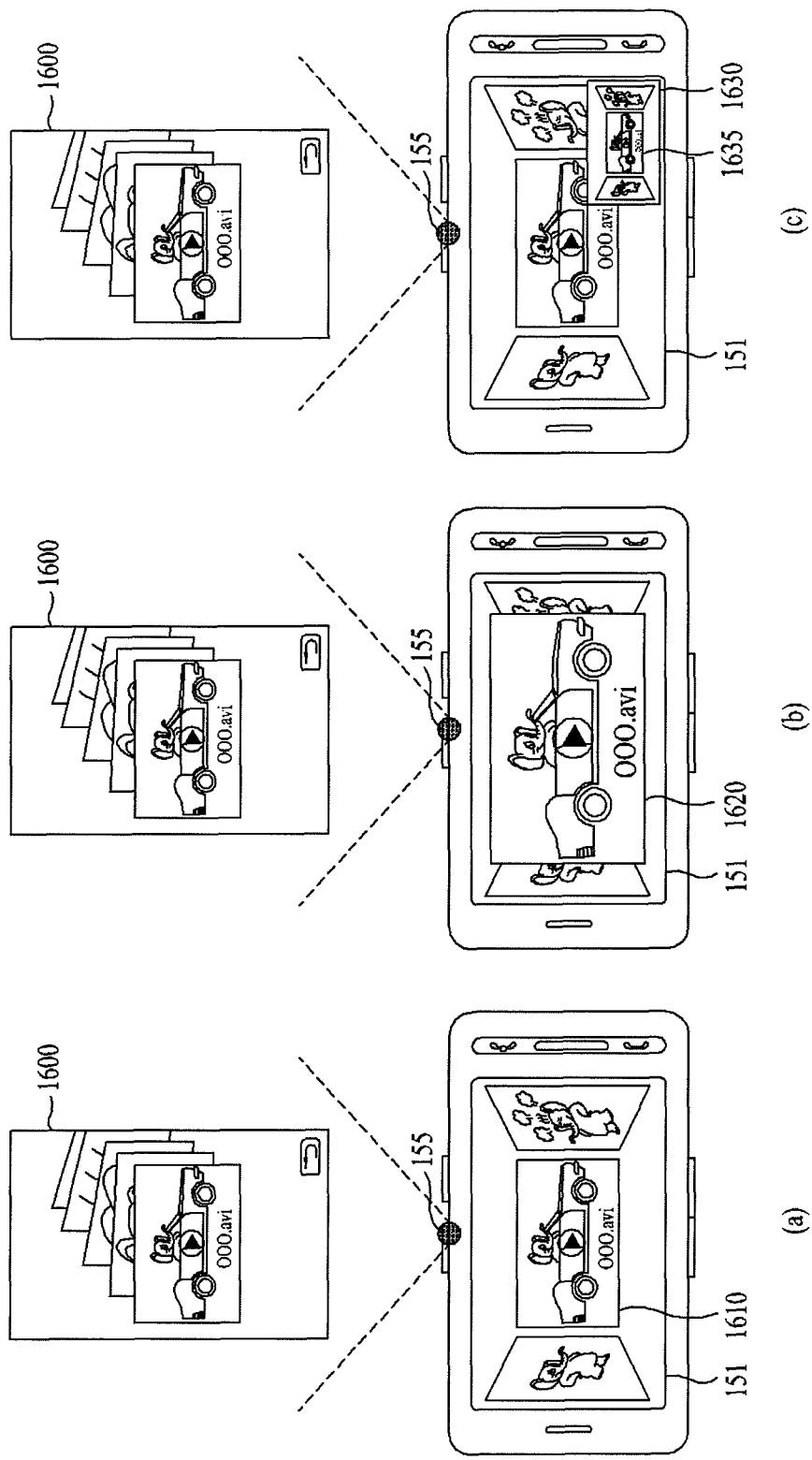
FIG. 16 is a diagram for examples of a method of displaying a region corresponding to an activated facet on a projection plane via a display unit according to one embodiment of the present invention.

FIG. 16 is a diagram for examples of a method of displaying a region corresponding to an activated facet on a projection plane via a display unit according to one embodiment of the present invention.

In FIG. 16, assume a case that three different facets are displayed as a 3D object of a stereoscopic user interface on the display unit 151. In particular, the three facets are arranged in a following manner. First of all, one of the three facets is positioned at the center. Secondly, the rest of the two facets are provided next to both lateral sides of the center-positioned facet to enclose, respectively. Moreover, assume a case that an image 1610 corresponding to the center-positioned facet is activated by being located at the head of a plurality of facets arranged on a projection plane 1600.

Referring to FIG. 16 (a), the controller 180 is able to display a region corresponding to a facet activated in the projection plane 1600 as an outline 1610 on a stereoscopic user interface displayed on the display unit 151.

Alternatively, the controller 180 is able to display a region corresponding to a facet activated in the projection plane 1600 as an image 1620 zoomed in on the stereoscopic user interface displayed on the display unit 151.

Alternatively, the controller 180 displays a mini map 1630 generated from zooming out the stereoscopic user interface near one corner of the display unit 151 and is then able to display a region corresponding to the facet activated in the projection plane 1600 as an outline 1635.

In the following description, the side information addition in the steps S30 and S40 described with reference to FIG. 6 is explained.

5) Side Information Addition

According to one embodiment of the present invention, the mobile terminal rearranges a plurality of facets, on which at least one portion of an image displayed on the display unit is displayed, in a 3D space and is then able to project the corresponding facets on an external plane via the projector module. In doing so, side information failing to be displayed on the display unit can be displayed on at least one portion of a plurality of the facets in the 3D space. In this case, as mentioned in the foregoing description, the side information is the information that is not currently displayed on the display unit 151 despite existing in the mobile terminal, and more particularly, in the memory 160 of the mobile terminal for example. This is described with reference to FIG. 17 as follows.

Figure 17:
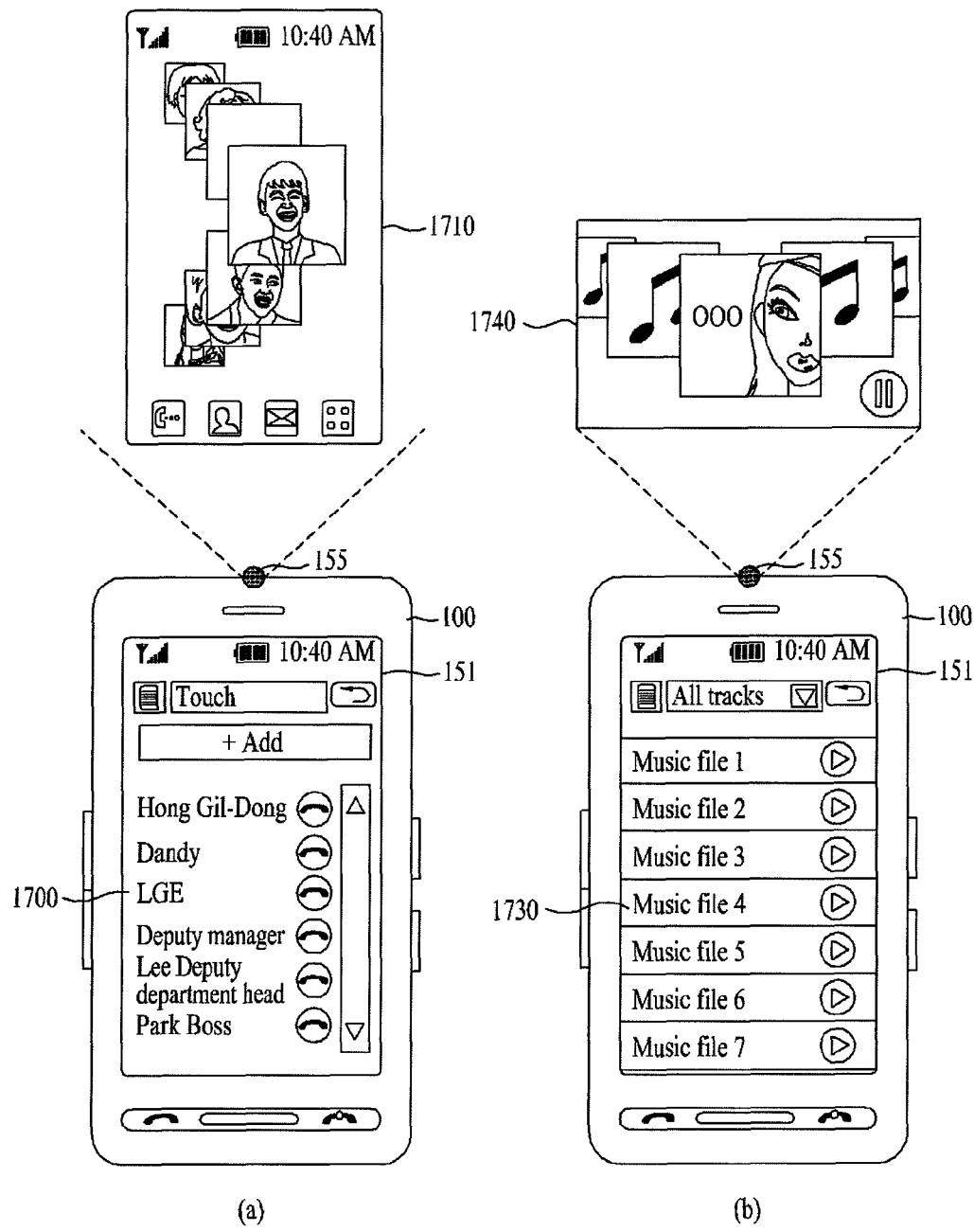
FIG. 17 is a diagram for examples of a method of displaying side information on a projection plane in a mobile terminal according to one embodiment of the present invention.

FIG. 17 is a diagram for examples of a method of displaying side information on a projection plane in a mobile terminal according to one embodiment of the present invention.

Referring to FIG. 17 (a), when a phonebook 1700 is executed on the display unit 151, phone numbers and names corresponding to the phone numbers can be displayed. In case that a picture file (e.g., a photo of a character corresponding to the phone number) linked to a specific number exists in the memory 160, a photo linked to a corresponding phonebook item can be displayed on each of the facets arranged in a prescribed pattern in the 3D space. For example, referring to FIG. 17 (a), photos can be displayed on the projection plane only. Alternatively, names and phone numbers can be displayed on the projection plane together with photos.

Referring to FIG. 17 (b), when an application of a music player 1730 is executed, music files added to a play list can be displayed on the display unit 151. In this case, if an album cover picture corresponding to a specific music file exists in the memory 160, an album cover picture corresponding to a file currently included in the play list can be displayed on the facets arranged in a prescribed pattern in the 3D space of the projection plane 1740. For example, referring to FIG. 17 (b), an album cover can be displayed only. Alternatively, such information as album title, singer, copyright information, play time, codec information and the like can be displayed together with the album cover.

Second Embodiment

According to another embodiment of the present invention, a mobile terminal reconfigures at least one 2D image displayed on a display unit 151 and other information and/or image failing to be displayed on the display unit 151 with a plurality of facets in a 3D space and is then able to project them on an external plane. Since the mobile terminal is able to project the information failing to be displayed on the display unit on the external plane, a user is able to conveniently view more information without limitation put on a size of the display unit.

In the following description, such a function provided by another embodiment of the present invention shall be named 'extended projection'. And, a facet on a projection plane, on which information failing to be displayed on a display unit is displayed, shall be named 'extended region'.

First of all, implementation of another embodiment of the present invention is described with reference to FIG. 18 as follows.

FIG. 18 is a diagram for one example of displaying information failing to be displayed on a display unit of a mobile terminal on a projection plane in addition and one example of configuration of the projection plane according to another embodiment of the present invention.

Referring to FIG. 18 (a), as a web browser is executed on the display unit 151, a prescribed webpage is displayed on the display unit 151. In doing so, the same content as displayed on the display unit 151 is projected on a center 1810 of a projection plane projected via the projector module 155 and other web pages can be displayed as other information failing to be displayed on the display unit 151 on the facets 1820 arranged next to both lateral sides of the center 1810.

For example, other information failing to be displayed on the display unit 151 can include a control menu of a currently executed application, a list of objects related to the currently executed application (e.g., a play list for music play, etc.), a picture of previous/next page, a preview of a selected object, a bookmark list, a thumbnail of file, a widget and the like.

A facet, on which a content displayed on the display unit is arranged, and facets, on which information failing to be displayed on the display unit is arranged, can be configured to have the pattern shown in FIG. 18 (b) for example, by which the present invention is non-limited. Alternatively, the above facets can have one of various arrangement patterns.

Whether to execute the above described extended projection function according to another embodiment of the present invention is set in advance by a method similar to the former method according to one embodiment of the present invention described with reference to FIG. 8 and FIG. 9 or can be activated at a random timing point by a user.

In the following description, a detailed example of another embodiment of the present invention is explained with reference to FIG. 19.

Figure 19:
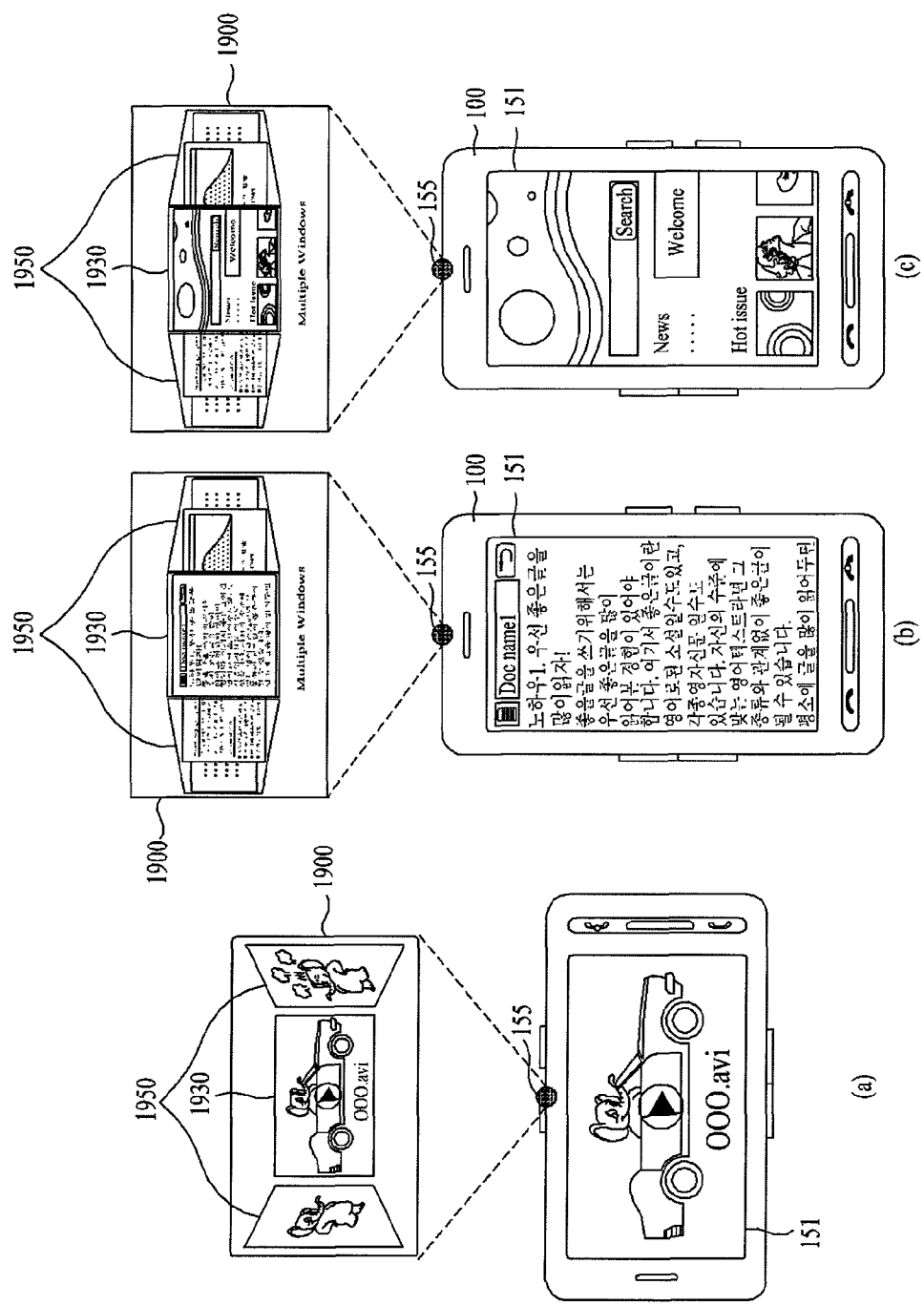
FIG. 19 is a diagram for examples of implementing an extended projection function in a mobile terminal according to another embodiment of the present invention.

FIG. 19 is a diagram for examples of implementing an extended projection function in a mobile terminal according to another embodiment of the present invention.

Referring to FIG. 19 (a), a movie play function is executed on the display unit 151 of the mobile terminal. In doing so, three facets can be arranged in a 3D space on a projection plane 1900 projected via the projector module 155. And, the same image as displayed on the display unit 151 can be displayed on the facet 1930 positioned at the center of the projection plane 1900. Moreover, a preview function of previewing another multimedia file in the play list can be executed on extended regions 1950 next to both sides of the facet 1930 positioned at the center.

Referring to FIG. 19 (b), an e-book reader function is executed on the display unit 151 of the mobile terminal. In doing so, five facets can be arranged in a 3D space on a projection plane 1900 projected via the projector module 155. And, the same page as displayed on the display unit 151 can be displayed on the facet 1930 positioned at the center of the projection plane 1900. Moreover, another page, list, book list and the like can be displayed on extended regions 1950 next to both sides of the facet 1930 positioned at the center.

Referring to FIG. 19 (c), a web browser is executed on the display unit 151 of the mobile terminal. In doing so, five facets can be arranged in a 3D space on a projection plane 1900 projected via the projector module 155. And, the same webpage as displayed on the display unit 151 can be displayed on the facet 1930 positioned at the center of the projection plane 1900. Moreover, a previous webpage, other webpages, a bookmark list, a site map and the like can be displayed on extended regions 1950 next to both sides of the facet 1930 positioned at the center.

Besides, it is a matter of course that the above-described embodiment of the present invention is applicable to various functions executable on the mobile terminal as well as the above-described application.

Third Embodiment

According to a further embodiment of the present invention, a method of displaying a stereoscopic image in a 3D space on a projection plane projected via a projector module is provided.

A 3D image can be displayed on a flat display unit by one of the following methods.

First of all, a 3D object is constructed with a polyhedron using a plurality of polygons to represent a shape seen in a specific view as a flat structure. In this case, the polygon indicates a most basic unit for configuring a 3D graphic. Facets of the polyhedron including the polygons are covered with prepared textures to represent various colors, patterns, texts and the like thereon, respectively. For instance, in order to configure the hexahedron 1000 shown in FIG. 10, the controller 180 connects 12 lines to 8 vertexes to form 6 planes and is then able to cover three of the 6 planes with circular, triangular and quadrangular textures, respectively. Afterwards, the controller 180 rotates the hexahedron formed by the above method and is then able to output the hexahedron in a specific direction to the projection plane via the projector module 155.

Secondly, when a plurality of images of a same target seen at a plurality of angles are prepared, an image seen in a view corresponding to a rotated angle according to a user's rotation command input or a determination made by the controller 180 can be outputted to the projection plane via the projector module. This is described with reference to FIG. 20 as follows.

Figure 20:
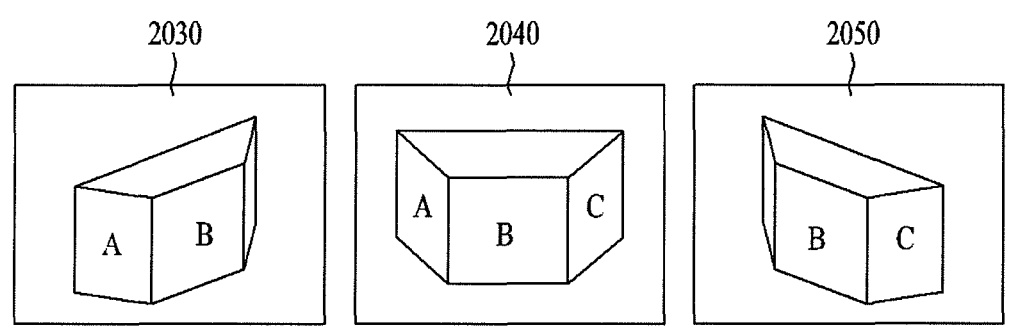
FIG. 20 is a diagram for one example of an image of a same target viewed in different angles according to a further embodiment of the present invention.

FIG. 20 is a diagram for one example of an image of a same target viewed in different angles according to a further embodiment of the present invention.

Referring to FIG. 20, an image generated from viewing a square pillar having a trapezoid topside from a left side 2030, an image generated from viewing the square pillar from a front side 2040, and an image generated from viewing the square pillar from a right side 2050 can be prepared in the memory 160 to represent one stereoscopic image. Assume that the projector module is assumed as projecting the front image 2050 as a default. If a user inputs a counterclockwise rotation command, the controller 180 enables the image 2030 generated from viewing the square pillar from the left side to be projected.

Thirdly, as different 2D images are provided to both eyes to merge together in a human brain, a user is able to sense depth and reality of a stereoscopic image. According to this method, prescribed additional equipments are necessary.

For example, the additional equipment includes polarized-film glasses. This method is called a stereoscopic system. In particular, if a single image generated from mixing two different images for both eyes together is displayed on a projection plane via projector module, the two images are separated from each other via the polarized glasses and are then delivered to both eyes, respectively.

In the following description, one example of projecting a stereoscopic image from a mobile terminal according to a further embodiment of the present invention by one of the above-mentioned methods is explained with reference to FIG. 21.

Figure 21:
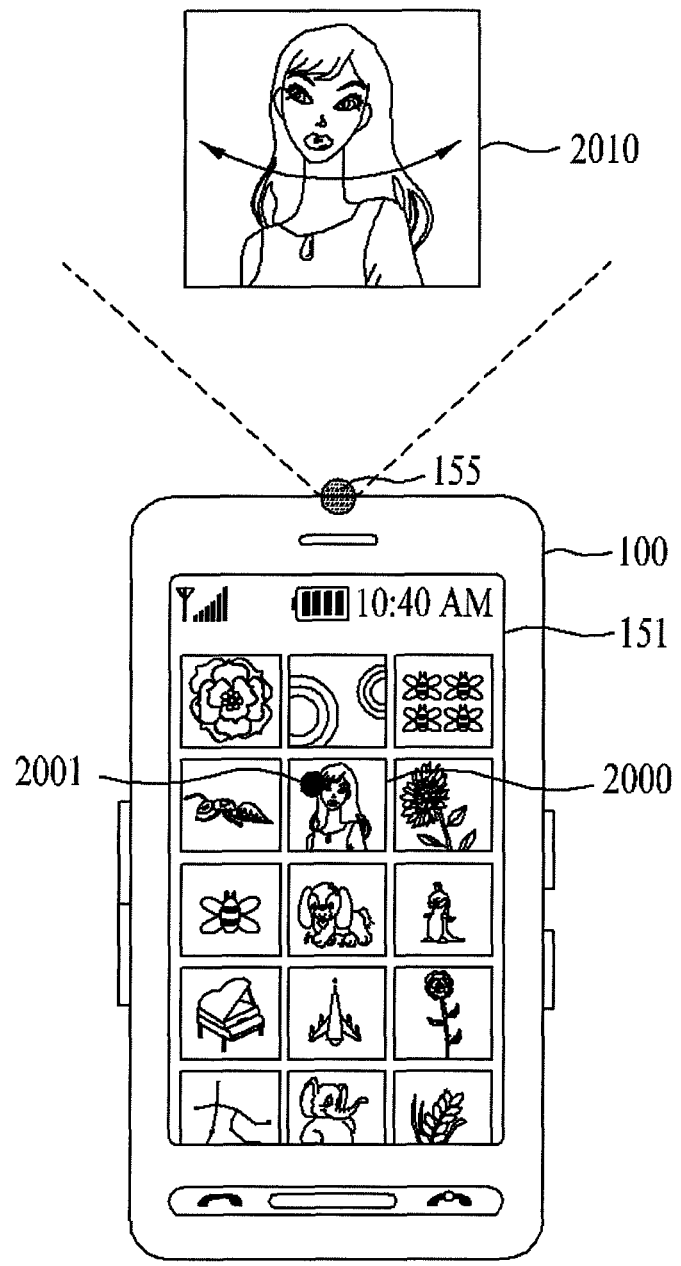
FIG. 21 is a diagram for one example of projecting a stereoscopic image from a mobile terminal according to a further embodiment of the present invention.

FIG. 21 is a diagram for one example of projecting a stereoscopic image from a mobile terminal according to a further embodiment of the present invention.

Referring to FIG. 21, a file list of a thumbnail type is displayed on the display unit 151. In this case, it is able to select a file of supporting a stereoscopic image using one of the above mentioned methods. In particular, a prescribed mark 2001 can be further displayed on a thumbnail 2001 of the file for supporting the stereoscopic image in order to inform a user that the thumbnail 2000 itself supports the stereoscopic image. Therefore, the stereoscopic image corresponding to the file selected by the user is displayed on a projection plane 2010. And, it is able to manipulate the stereoscopic image by one of the various projection plane controlling methods including the former methods described with reference to FIG. 13 to 15.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a user input unit;
   a display including a touch screen configured to recognize a touch input from a user and display a plurality of objects including at least first and second widget objects arranged in a first 3-dimensional (3D) pattern as a first display;
   a projector configured to project a second display on an external plane, the second display displaying a plurality of facets including at least a first facet and a second facet; and
   a controller configured to:
   map the first and second widget objects of the first display to the first and second facets of the second display, respectively,
   project the first facet having the first widget object and first side information of the first widget object and the second facet having the second widget object and second side information of the second widget object on the external plane as the second display, the first and second widget facets being arranged in a second 3D pattern different from the first 3D pattern, such that the first and second widget objects partially overlap each other in the second 3D pattern, wherein the first and the second side information is information that is not displayed on the display despite existing in a memory of the mobile terminal,
   assign a number to each of the plurality of objects,
   if the number corresponding to a specific planar object among the plurality of the objects is inputted via the user input unit, control the specific planar object to be recognized as the first widget object and mapped to the first facet,
   each time the first widget object and the second widget object are sequentially selected to be mapped to the first facet and the second facet, respectively, control at least one of an arrangement pattern and direction of the plurality of the facets to be changed,
   each time the first widget object and the second widget object are sequentially selected, display a visual effect on the first facet to indicate that the selected first widget object is mapped to the first facet, and display a visual effect on the second facet to indicate that the selected second widget object is mapped to the second facet,
   in response to a detection of a first touch input on the touch screen, display a cursor on the projected second display without displaying the cursor on the first display displayed on the touch screen of the display, and
   in response to a detection of a second touch input on the touchscreen, move the displayed cursor according to the second touch input.

2. The mobile terminal of claim 1, wherein the plurality of the objects further include at least one of a thumbnail, an icon, a webpage, at least one page of an e-book, at least one portion of one facet of a polyhedral user interface, a multimedia player, a file list, and an application executed image.

3. The mobile terminal of claim 1, wherein the second widget object comprises a stereoscopic object of the first widget object.

4. A method of controlling a mobile terminal, comprising:
  displaying a first display including a plurality of objects including at least first and second widget objects arranged in a first 3-dimensional (3D) pattern on a display unit including a touch screen configured to recognize a touch input from a user;
  selecting, via a controller, a second 3D pattern for arranging a first facet and a second facet in a 3-dimensional space on a second display;
  selecting, via the controller, the first and second widget objects among the plurality of objects to be mapped to the first and second facets respectively;
  projecting the second display including the first facet having the first widget object and first side information of the first widget object and the second facet having the second widget object and second side information of the second widget object on an external plane via a projector module, the first and second facets being arranged in a second 3D pattern different from the first 3D pattern such that the first and second widget objects partially overlap each other in the second 3D pattern, wherein the first and the second side information is information that is not displayed on the display despite existing in a memory of the mobile terminal;
  assigning, via the controller, a number to each of the plurality of objects;
  if the number corresponding to a specific planar object among the plurality of the objects is inputted via a user input unit, controlling, via the controller, the specific planar object to be recognized as the first widget object and mapped to the first facet;
  each time the first widget object and the second widget object are sequentially selected to be mapped to the first facet and the second facet, respectively, controlling, via the controller, at least one of an arrangement pattern and direction of the plurality of the facets to be changed;
  each time the first widget object and the second widget object are sequentially selected, displaying, via the controller, a visual effect on the first facet to indicate that the selected first widget object is mapped to the first facet, and displaying a visual effect on the second facet to indicate that the selected second widget object is mapped to the second facet;
  in response to a detection of a first touch input on the touch screen, displaying, via the controller, a cursor on the projected second display without displaying the cursor on the first display, and
  in response to a detection of a second touch input on the touchscreen, moving via the controller, the displayed cursor according to the second touch input.

5. The mobile terminal of claim 1, wherein the controller further displays a window on the first display, when the first touch input is received, and the second touch input is applied within the displayed window.

6. The method of claim 4, further comprising:
  when the first touch input is received,
  displaying a window on the first display,
  wherein the second touch input is applied within the displayed window.

7. The mobile terminal of claim 1,
  wherein the controller is further configured to:
  map a region of the first display to the first facet of the second display, and
  select the region based on a first touch point and a second touch point of a third touch input applied to the touch screen, and
  wherein the region includes at least the first widget object of the plurality of objects.

8. The method of claim 4,
  wherein the selecting an image comprises determining the image based on a first touch point and a second touch point of a third touch input applied to the touch screen.

9. The mobile terminal of claim 7, wherein the third touch input includes a touch-drag input, and
  wherein the first touch point is a start point of the touch-drag input and the second touch point is an end point of the touch-drag input.

10. The mobile terminal of claim 9, wherein the first widget object is included in a rectangular region which has the first touch point and the second touch point as two corners confronting each other in a diagonal direction.

11. The mobile terminal of claim 8, wherein the third touch input includes a touch-drag input, and
  wherein the first touch point is a start point of the touch-drag input and the second touch point is an end point of the touch-drag input.

12. The mobile terminal of claim 11, wherein the first widget object is included in a rectangular region which has the first touch point and the second touch point as two corners confronting each other in a diagonal direction.

* * * * *